(12) United States Patent
Daily et al.

(10) Patent No.: US 11,194,458 B2
(45) Date of Patent: Dec. 7, 2021

(54) GENERATING AND MODIFYING CONTENT USING DATA STRUCTURES

(71) Applicant: The Rocket Science Group LLC, Atlanta, GA (US)

(72) Inventors: Bradley Stephen Daily, Brooklyn, NY (US); Jacob Davidson, Atlanta, GA (US); Lara Adrian Hercules, Atlanta, GA (US); Stephanie Coleman, Brooklyn, NY (US); Alexandra Grace Kelly, Decatur, GA (US); Natalie Irene Ung, Brooklyn, NY (US)

(73) Assignee: The Rocket Science Group LLC, Atlanta, GA (US)

(*) Notice: Subject to any disclaimer, the term of this patent is extended or adjusted under 35 U.S.C. 154(b) by 0 days.

(21) Appl. No.: 17/316,635

(22) Filed: May 10, 2021

(65) Prior Publication Data
US 2021/0349614 A1    Nov. 11, 2021

Related U.S. Application Data

(60) Provisional application No. 63/022,460, filed on May 9, 2020.

(51) Int. Cl.
| | | |
|---|---|---|
| *G06F 3/0482* | (2013.01) | |
| *G06F 3/0484* | (2013.01) | |
| *G06F 8/65* | (2018.01) | |

(52) U.S. Cl.
CPC ........ *G06F 3/04845* (2013.01); *G06F 3/0482* (2013.01); *G06F 8/65* (2013.01)

(58) Field of Classification Search
CPC ....... G06F 3/04845; G06F 3/0482; G06F 8/65
See application file for complete search history.

(56) References Cited

U.S. PATENT DOCUMENTS

| | | | |
|---|---|---|---|
| 8,090,612 B2* | 1/2012 | Chao | G06Q 30/02 705/7.29 |
| 9,990,114 B1* | 6/2018 | Horton | G06Q 30/02 |
| 10,228,829 B1* | 3/2019 | Shiva | G06Q 30/0241 |
| 10,853,837 B2* | 12/2020 | Klimetschek | G06Q 30/0242 |
| 2004/0230917 A1* | 11/2004 | Bales | G06F 3/0481 715/854 |
| 2007/0022003 A1* | 1/2007 | Chao | G06Q 30/0201 705/14.46 |
| 2014/0047413 A1* | 2/2014 | Sheive | G06F 8/30 717/110 |
| 2018/0276686 A1* | 9/2018 | Brandstetter | G06Q 30/0204 |
| 2019/0392488 A1* | 12/2019 | Choi | G06Q 30/0276 |
| 2021/0004874 A1* | 1/2021 | Bur | G06Q 30/0269 |
| 2021/0073708 A1* | 3/2021 | Levin | G06Q 20/385 |

* cited by examiner

*Primary Examiner* — Anil K Bhargava
(74) *Attorney, Agent, or Firm* — Morris, Manning & Martin, LLP; Daniel E. Sineway; Adam J. Thompson

(57) ABSTRACT

A content editor for generating content including root blocks and nested blocks is disclosed. The content editor can generate a deployment that includes the content. The content editor can generate user interface code configured to edit the content. The content editor can receive updates to the content and update the root blocks and nested blocks. The updated root blocks and nested blocks can be used to generate updated content for editing and/or can be deployed to end-users.

20 Claims, 13 Drawing Sheets

FIG. 3

```
{
  "type": "ROOT",
  "properties": {
    "globals": {
      "buttonBackgroundColor": "blue"
    }
  }
}
```
FIG. 7A

```
{
  "type": "BUTTON",
  "properties": {
    "borderRadius": 2
  }
}
```
FIG. 7B

```
{
  "type": "BUTTON",
  "properties": {
    "backgroundColor": "blue",
    "borderRadius": 2
  }
}
```
FIG. 7C

```
{
  "type": "ROOT",
  "properties": {
    "globals": {
      "buttonBackgroundColor": "blue",
      "buttonBorderRadius": 4,
    }
  }
}
```
FIG. 7D

```
{
  "type": "BUTTON",
  "properties": {
    "borderRadius": 2
  }
}
```
FIG. 7E

```
{
  "type": "BUTTON",
  "properties": {
    "backgroundColor": "blue",
    "borderRadius": 2
  }
}
```
FIG. 7F

GENERATING AND MODIFYING CONTENT USING DATA STRUCTURES

CROSS-REFERENCE TO RELATED APPLICATIONS

This application claims the benefit of and priority to U.S. Provisional Patent Application No. 63/022,460, filed May 9, 2020, and entitled "GENERATING AND MODIFYING CONTENT USING DATA STRUCTURES," the disclosure of which is herein incorporated by reference in its entirety.

BACKGROUND

When editing content via a web interface, the editing experience is often suboptimal when compared to a native content editor, such as Microsoft Word®. Limitations of web browser and client-server technology combined with the nature of HTML, CSS, and other markup languages provide challenges to providing a content editor. As pages are stored and edited in various markup languages, the editor must be aware of the languages as well as the scope of each change. As an example, a font preference may be set for multiple sections of text as a collection and a change to one section may affect the others or require changes to all sections. In addition, certain types of edits may affect different browsers differently.

SUMMARY

According to a first aspect, a system for generating a deployment, comprising: A) a data store; and B) at least one computing device in communication with the data store, the at least one computing device being configured to: 1) generate the deployment comprising a root block and a plurality of nested blocks; 2) generate user interface code configured to edit content for the deployment; 3) receive a plurality of edits to the content of the deployment via the user interface code over a period of time; and 4) subsequent to each of the plurality of edits: i) apply a respective edit to at least one of: the root block and at least one of the plurality of nested blocks; ii) generate updated user interface code based on the root block and the plurality of nested blocks; and iii) render an updated user interface on a display according to the updated user interface code.

According to a further aspect, the system for generating a deployment of the first aspect or any other aspect, wherein the at least one computing device is further configured to generate the user interface code for the deployment by: A) parsing the root block and the plurality of nested blocks; B) generating the user interface code based on the root block and the plurality of nested blocks; and C) causing a user interface to be rendered on the display according to the user interface code.

According to a further aspect, the system for generating a deployment of the first aspect or any other aspect, wherein the at least one computing device is further configured to: A) receive an election of a particular deployment type of a plurality of deployment types; B) identify a renderer of a plurality of renderers based on the particular deployment type; and C) generate deployment output data, via the renderer, corresponding to the particular deployment type from the root block and the plurality of nested blocks.

According to a further aspect, the system for generating a deployment of the first aspect or any other aspect, wherein the deployment output data comprises second user interface code and a first code language of the user interface code differs from a second code language of the second user interface code.

According to a further aspect, the system for generating a deployment of the first aspect or any other aspect, wherein the deployment further comprising a plurality of root blocks that includes the root block.

According to a further aspect, the system for generating a deployment of the first aspect or any other aspect, wherein the at least one computing device is further configured to store the deployment along with the root block and the plurality of nested blocks in the data store.

According to a further aspect, the system for generating a deployment of the first aspect or any other aspect, wherein a particular one of the plurality of edits corresponds to a global change for a particular type of nested blocks and the at least one computing device is further configured to modify a subset of the plurality of nested blocks according to the global change by iterating through the nested blocks, wherein the subset corresponds to the particular type of nested blocks.

According to a further aspect, the system for generating a deployment of the first aspect or any other aspect, wherein a particular one of the plurality of edits corresponds to a global change for a particular type of nested blocks and the at least one computing device is further configured to modify an element of the root block according to the global change.

According to a further aspect, the system for generating a deployment of the first aspect or any other aspect, wherein the at least one computing device is further configured to: A) iterate through the plurality of nested blocks; and B) generate a plurality of intermediary nested blocks by applying a plurality of global styles from the root block to the plurality of nested blocks, where the updated user interface code is generated based on the plurality of intermediary nested blocks.

According to a second aspect, a method for generating a deployment, comprising: A) generating, via the at least one computing device, a user interface code configured to edit content for the deployment comprising a root block and a plurality of nested blocks; B) receiving, via the at least one computing device, at least one edit to content of the deployment via the user interface code over a period of time; and C) subsequent to the at least one edit: 1) applying, via the at least one computing device, the at least one edit to at least one of: the root block and at least one of the plurality of nested blocks; 2) generating, via the at least one computing device, updated user interface code based on the root block and the plurality of nested blocks; and 3) rendering, via the at least one computing device, an updated user interface on a display according to the updated user interface code.

According to a further aspect, the method of the second aspect or any other aspect, further comprising: A) receiving, via the at least one computing device, an election of a particular deployment type of a plurality of deployment types; B) identifying, via the at least one computing device, a renderer of a plurality of renderers corresponding to the particular deployment type; and C) generating, via the at least one computing device and the renderer, deployment output data corresponding to the particular deployment type from the root block and the plurality of nested blocks.

According to a further aspect, the method of the second aspect or any other aspect, further comprising: A) receiving, via the at least one computing device, a second election of a second particular deployment type of the plurality of deployment types, the second particular deployment type differing from the particular deployment type; B) identifying, via the at least one computing device, a second renderer of a plurality of renderers corresponding to the particular deployment type, the second renderer differing from the renderer; and C) generating, via the at least one computing device and the second renderer, second deployment output data corresponding to the second particular deployment type from the root block and the plurality of nested blocks.

According to a further aspect, the method of the second aspect or any other aspect, wherein a first coding language corresponding to the deployment output data differs from a second coding language corresponding to the second deployment output data.

According to a further aspect, the method of the second aspect or any other aspect, wherein the deployment further comprising a plurality of root blocks that includes the root block.

According to a third aspect, a non-transitory computer-readable medium embodying a program for generating a deployment, wherein the program, when executed by at least one computing device, causes the at least one computing device to: A) generate the deployment comprising root block and a plurality of nested blocks; B) generate a user interface code configured to edit content for the deployment; C) receive a plurality of edits to the content of the deployment via the user interface code over a period of time; D) apply the plurality of edits to at least one of: the root block and at least one of the plurality of nested blocks; E) generate updated user interface code based on the root block and the plurality of nested blocks; and F) render an updated user interface on a display according to the updated user interface code.

According to a further aspect, the non-transitory computer-readable medium of the third aspect or any other aspect, wherein the user interface code is represented by a different format than the root block and the plurality of nested blocks.

According to a further aspect, the non-transitory computer-readable medium of the third aspect or any other aspect, wherein the root block and the plurality of nested blocks are stored as a data in data structures.

According to a further aspect, the non-transitory computer-readable medium of the third aspect or any other aspect, wherein applying the plurality of edits comprises the program causing the at least one computing device to: A) determine that a global update option been selected for any of the plurality of edits; and B) in response to the global update option being selected, update the root block to according to a subset of the plurality of edits.

According to a further aspect, the non-transitory computer-readable medium of the third aspect or any other aspect, wherein applying the plurality of edits comprises the program causing the at least one computing device to: A) determine that a global update option been selected; B) in response to the global update option being selected: iterate through the plurality of nested blocks; and C) in each iteration for a respective block: 1) determine whether any of the plurality of edits correspond to the respective block; and 2) in response to a subset of the plurality of edits corresponding to the respective block, apply the subset of the plurality of edits to the respective block.

According to a further aspect, the non-transitory computer-readable medium of the third aspect or any other aspect, wherein applying the plurality of edits comprises the program causing the at least one computing device to: A) determine that a global update option is unselected for a particular edit of the plurality of edits corresponding to a particular nested block; and B) in response to the global update option being unselected, apply the particular edit to the particular nested block.

According to a fourth aspect, a system for modifying a deployment, comprising: A) a data store; and B) at least one computing device in communication with the data store, the at least one computing device being configured to: 1) generate the deployment comprising a root block and a plurality of nested blocks; 2) generate user interface code configured to edit the deployment. identify a hover event over an edge of a user interface component corresponding to a particular nested block of the plurality of nested blocks; 3) update the user interface component to include a resize interface component to facilitate resizing the user interface component; 4) receive an election of the resize interface component and at least one additional input; 5) responsive to the election, update the user interface component in real-time to adjust according to the at least one additional input; and 6) update at least one nested block of the plurality of nested blocks according to election and the at least one additional input, the at least one nested block comprising the particular nested block.

According to a further aspect, the system of the fourth aspect or any other aspect, wherein the at least one computing device is further configured to generate an updated user interface comprising the user interface component sized according to the updated at least one nested block.

According to a further aspect, the system of the fourth aspect or any other aspect, wherein the at least one computing device is further configured to generate the user interface code for the deployment by: A) parsing the root block and the plurality of nested blocks; B) generating the user interface code based on the root block and the plurality of nested blocks; and C) causing a user interface to be rendered on a display according to the user interface code.

According to a further aspect, the system of the fourth aspect or any other aspect, wherein the user interface code is generated based on a plurality of policies and at least one computing device is further configured to generate, via the user interface code, a plurality of editing limits according to the plurality of policies.

According to a further aspect, the system of the fourth aspect or any other aspect, wherein the at least one computing device is further configured to: A) analyze historical data corresponding to nested and root blocks from a plurality of deployments and performance metrics for the plurality of deployments; and B) generate the plurality of policies based on the historical data.

According to a further aspect, the system of the fourth aspect or any other aspect, wherein at least one of the plurality of policies corresponds to at least one of: spacing of text, spacing of columns, spacing of rows, sizing fractions of components, and restricting of a color pallet.

According to a further aspect, the system of the fourth aspect or any other aspect, wherein the plurality of nested blocks comprises a plurality of composite blocks that each depend from a respective at least one primitive block.

According to a further aspect, the system of the fourth aspect or any other aspect, wherein the at least one computing device is further configured to: A) receive an election of an element for a component corresponding to one of the plurality of nested blocks; B) determine at least one other existing element corresponding to a different one of the plurality of nested blocks; and C) adjusting the at least one other existing element based on the election of the element based on a plurality of policies.

According to a fifth aspect, a method for modifying a deployment, comprising: A) generating, via at least one computing device, the deployment comprising a root block and a plurality of nested blocks; B) generating, via at least one computing device, user interface code configured to edit the deployment; C) receiving a request to edit a component corresponding to a particular nested block of the plurality of nested blocks; D) determining a plurality of elements for the component based on a block type of the particular nested block; E) generating a respective set of options for individual ones of the plurality of elements based on a current value of the individual ones of the plurality of elements; F) receiving, via at least one computing device, an election of a particular option from the respective set of options for at least one of the plurality of elements; G) responsive to the election, updating, via at least one computing device, at least one of: the root block and individual ones of the plurality of nested blocks according to the election of the particular option; and H) generating, via the at least one computing device, an updated user interface comprising the component modified according to the particular option selected.

According to a further aspect, the method of the fifth aspect or any other aspect, wherein updating the at least one of: the root block and the individual ones of the plurality of nested blocks according to the election of the particular option comprises: A) determining, via the at least one computing device, whether a global update option been selected; B) in response to the global update option being selected, updating, via the at least one computing device, the root block to specify the particular option for the block type; and C) in response to the global update option being unselected, updating, via the at least one computing device, the particular nested block to specify the particular option for the block type.

According to a further aspect, the method of the fifth aspect or any other aspect, wherein updating the at least one of: the root block and the individual ones of the plurality of nested blocks according to the election of the particular option comprises: A) determining, via the at least one computing device, whether a global update option been selected; B) in response to the global update option being selected: 1) iterating, via the at least one computing device, through the plurality of nested blocks; and 2) in each iteration for a respective block: i) determining, via the at least one computing device, whether the respective block is of the block type; and ii) in response to the respective block being of the block type, updating, via the at least one computing device, the respective block to specify the particular option; and in response to the global update option being unselected, updating, via the at least one computing device, the particular nested block to specify the particular option for the block type.

According to a further aspect, the method of the fifth aspect or any other aspect, further comprising storing, via the at least one computing device, the deployment along with the root block and the plurality of nested blocks in a structured database.

According to a sixth aspect, a non-transitory computer-readable medium embodying a program for generating a deployment, wherein the program, when executed by at least one computing device, causes the at least one computing device to: A) generate the deployment comprising a root block and a plurality of nested blocks; B) generate user interface code configured to edit the deployment; C) identify a hover event over an edge of a user interface component corresponding to a particular nested block of the plurality of nested blocks; D) update the user interface component to include a resize interface component to facilitate resizing the user interface component; E) receive an election of the resize interface component and at least one additional input; F) responsive to the election, update the user interface component in real-time to adjust according to the at least one additional input; G) update at least one nested block of the plurality of nested blocks according to election and the at least one additional input, the at least one nested block comprising the particular nested block; and H) generate an updated user interface comprising the user interface component sized according to the updated at least one nested block.

According to a further aspect, the non-transitory computer-readable medium of the sixth aspect or any other aspect, wherein the program further causes at least one computing device to generate the user interface code for the deployment by: A) parsing the root block and the plurality of nested blocks; B) generating the user interface code based on the root block and the plurality of nested blocks; and C) causing a user interface to be rendered on a display according to the user interface code.

According to a further aspect, the non-transitory computer-readable medium of the sixth aspect or any other aspect, wherein the user interface code is generated based on a plurality of policies and the program further causes the at least one computing device to generate, via the user interface code, a plurality of editing limits according to the plurality of policies.

According to a further aspect, the non-transitory computer-readable medium of the sixth aspect or any other aspect, wherein the program further causes at least one computing device to: A) analyze historical data corresponding to nested and root blocks from a plurality of deployments and performance metrics for the plurality of deployments; and B) generate a plurality of policies based on the historical data.

According to a further aspect, the non-transitory computer-readable medium of the sixth aspect or any other aspect, wherein at least one of the plurality of policies corresponds to at least one of: spacing of text, spacing of columns, spacing of rows, sizing fractions of components, and restricting of a color pallet.

According to a further aspect, the non-transitory computer-readable medium of the sixth aspect or any other aspect, wherein the plurality of nested blocks comprises a plurality of composite blocks that each depend from a respective at least one primitive block.

According to a further aspect, the non-transitory computer-readable medium of the sixth aspect or any other aspect, wherein the program further causes at least one computing device to: A) receive an election of an element for a component corresponding to one of the plurality of nested blocks; B) determine at least one other existing element corresponding to a different one of the plurality of nested blocks; and C) adjusting the at least one other existing element based on the election of the element and a plurality of policies.

According to a further aspect, the non-transitory computer-readable medium of the sixth aspect or any other aspect, wherein the program further causes at least one computing device to: A) receive an election of a value of an element for a component corresponding to one of the plurality of nested blocks, the election adjusting a value of the element in a particular direction; B) determine a plurality of other elements corresponding to a plurality of different ones of the plurality of nested blocks; and C) adjusting a respective value of the plurality of other elements in the particular direction based on the election of the element based on a plurality of policies.

According to a seventh aspect, a system for providing web content, comprising: A) a data store; and B) at least one computing device in communication with the data store, the at least one computing device being configured to: 1) receive a request to register a particular name as a domain name; 2) register the particular name as the domain name; 3) receive a request to edit a component corresponding to a particular nested block of a particular template comprising a root block and a plurality of nested blocks; 4) determine a plurality of elements for the component based on a block type of the particular nested block; 5) generate a respective set of options for individual ones of the plurality of elements based on a current value of the individual ones of the plurality of elements; 6) receive an election of a particular option from the respective set of options for at least one of the plurality of elements; 7) responsive to the election, update at least one of: the root block and individual ones of the plurality of nested blocks according to the election of the particular option; and 8) generate updated user interface code comprising the component modified according to the particular option selected.

According to a further aspect, the system of the seventh aspect or any other aspect, wherein the at least one computing device is further configured to generate user interface code to edit a page according to the particular template.

According to a further aspect, the system of the seventh aspect or any other aspect, wherein the user interface code comprises an option to select at least one additional template.

According to a further aspect, the system of the seventh aspect or any other aspect, wherein the at least one computing device is further configured to: A) receive a request to deploy a web page; B) generate the web page by performing a rendering process on the root block and the plurality of nested blocks as updated; C) store the web page on a storage location; D) configure a web server to host the domain name based on the storage location; and E) configure at least one resource record of a domain name system for the domain name based on elements of the web server.

According to a further aspect, the system of the seventh aspect or any other aspect, wherein the elements of the web server comprises at least one name server.

According to a further aspect, the system of the seventh aspect or any other aspect, wherein the at least one computing device is further configured to: A) identify a hover event over an edge of a user interface component corresponding to a second particular nested block of the plurality of nested blocks; B) update the user interface component to include a resize interface component to facilitate resizing the user interface component; C) receive an election of the resize interface component and at least one additional input; D) responsive to the election, update the user interface component in real-time to adjust according to the at least one additional input; and E) update at least one nested block of the plurality of nested blocks according to election and the at least one additional input, the at least one nested block comprising the second particular nested block.

According to a further aspect, the system of the seventh aspect or any other aspect, wherein the at least one computing device is further configured to generate the respective set of options for the individual ones of the plurality of elements by removing at least one option from a plurality of options based on the current value of the individual ones of the plurality of elements and a plurality of policies.

According to an eighth aspect, a method for providing web content, comprising: A) registering, via the at least one computing device, a particular name as a domain name; B) generating, via the at least one computing device, a user interface comprising a plurality of templates for a landing page of the domain name; C) receiving, via the at least one computing device, an election of a particular template of the plurality of templates; D) generating, via the at least one computing device, user interface code to edit the landing page according to the particular template comprising a root block and a plurality of nested blocks; E) receiving, via the at least one computing device, a request to edit a component corresponding to a particular nested block of the plurality of nested blocks; F) determining, via the at least one computing device, a plurality of elements for the component based on a block type of the particular nested block; G) generating, via the at least one computing device, a respective set of options for individual ones of the plurality of elements based on a current value of the individual ones of the plurality of elements; H) receiving, via the at least one computing device, an election of a particular option from the respective set of options for at least one of the plurality of elements; I) responsive to the election, generating, via the at least one computing device, an updated landing page by updating at least one of: the root block and individual ones of the plurality of nested blocks according to the election of the particular option; and J) in response to a web request, providing, via the at least one computing device, the updated landing page based on the root block and the plurality of nested blocks.

According to a further aspect, the method of the eighth aspect or any other aspect, further comprising updating, via the at least one computing device, at least one nested block of the plurality of nested blocks based on a hover event and an additional input.

According to a further aspect, the method of the eighth aspect or any other aspect, further comprising adjusting, via the at least one computing device, a particular element of the plurality of elements based on an election of the particular element and a plurality of policies.

According to a further aspect, the method of the eighth aspect or any other aspect, further comprising receiving, via the at least one computing device, a request to register the particular name as the domain name.

According to a further aspect, the method of the eighth aspect or any other aspect, wherein the particular template comprises a plurality of sections in a hierarchical structure, and individual ones of the plurality of sections comprise a respective subset of the plurality of nested blocks.

According to a ninth aspect, a non-transitory computer-readable medium embodying a program that, when executed by at least one computing device, causes the at least one computing device to: A) receive a request to register a particular name as a domain name; B) receive an election of a particular template of a plurality of templates for a landing page for the domain name, wherein the particular template comprises a root block and a plurality of nested blocks; C) generate user interface code to edit a page according to the particular template; D) receive a request to edit a component corresponding to a particular nested block of the plurality of nested blocks; E) determine a plurality of elements for the component based on a block type of the particular nested block; F) generate a respective set of options for individual ones of the plurality of elements based on a current value of the individual ones of the plurality of elements; G) receive an election of a particular option from the respective set of options for at least one of the plurality of elements; H)

responsive to the election, generate an updated landing page by updating at least one of: the root block and individual ones of the plurality of nested blocks according to the election of the particular option; and I) configure a web service to host the domain name with the updated landing page as a web page.

According to a further aspect, the non-transitory computer-readable medium of the ninth aspect or any other aspect, wherein generate a respective set of options for individual ones of the plurality of elements further comprises applying a particular style policy corresponding to a current user account.

According to a further aspect, the non-transitory computer-readable medium of the ninth aspect or any other aspect, wherein the particular style policy comprises a plurality of rules and the program further causes the at least one computing device to enforce the plurality of rules.

According to a further aspect, the non-transitory computer-readable medium of the ninth aspect or any other aspect, wherein the program further causes the at least one computing device to register the particular name as the domain name.

According to a further aspect, the non-transitory computer-readable medium of the ninth aspect or any other aspect, wherein the program further causes the at least one computing device to configure the web service by generating an HTML page for the web page and storing the web page in a folder corresponding to a configured location for the web page.

According to a further aspect, the non-transitory computer-readable medium of the ninth aspect or any other aspect, wherein the program further causes the at least one computing device to configure the web service by generating a plurality of resource records in a domain name system.

According to a further aspect, the non-transitory computer-readable medium of the ninth aspect or any other aspect, wherein the program further causes the at least one computing device to generate the updated landing page by: A) parsing the root block and the plurality of nested blocks; and B) rendering the updated landing page.

According to a further aspect, the non-transitory computer-readable medium of the ninth aspect or any other aspect, wherein the plurality of nested blocks are arranged in a hierarchical structure.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 illustrates an exemplary portion of a content editor page rendered in the networked environment of FIG. 2 according to various embodiments of the present disclosure.

FIGS. 7A-7F illustrate exemplary nested blocks according to various embodiments of the present disclosure.

DETAILED DESCRIPTION

Figure 1:
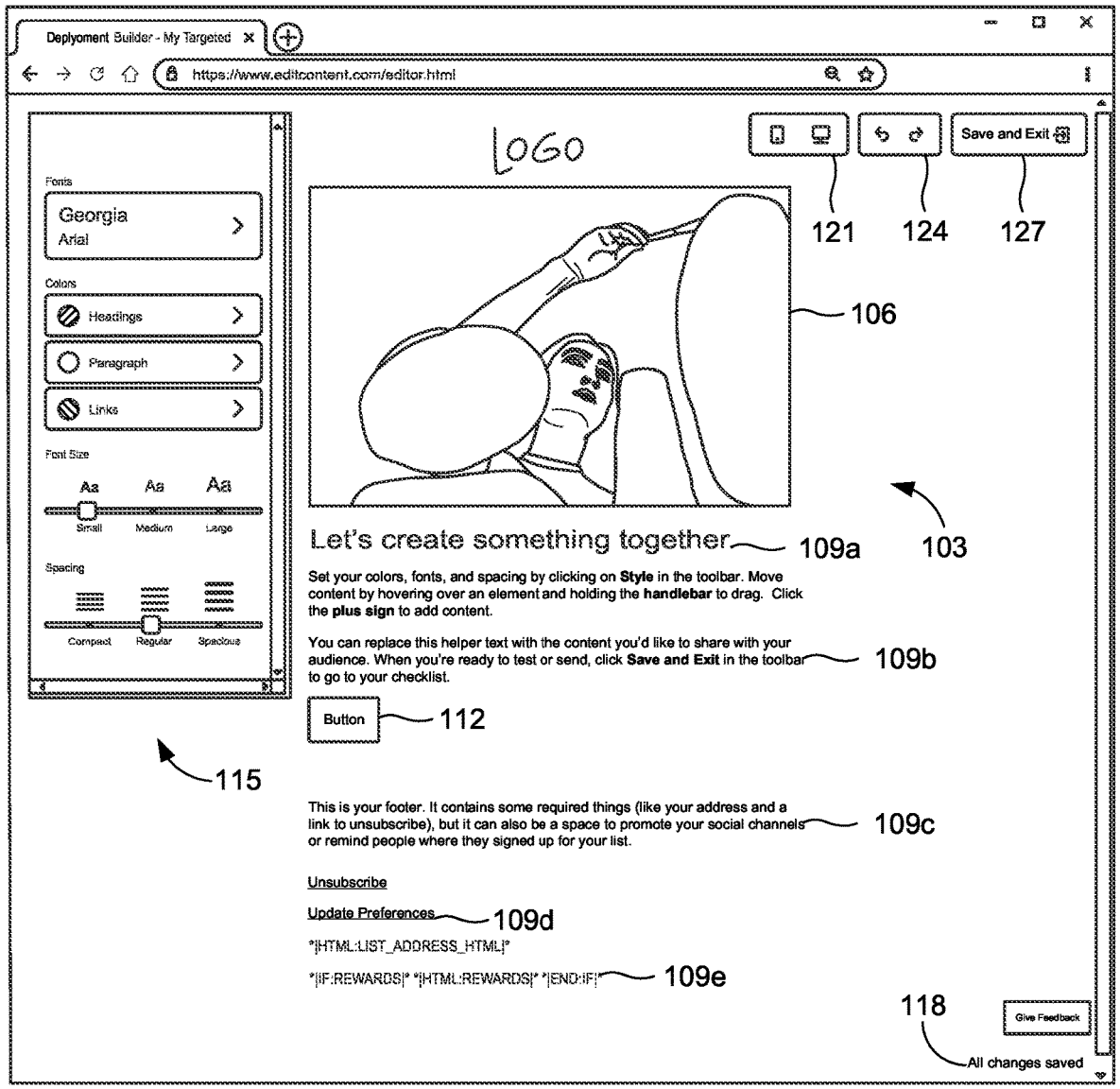
FIG. 1 illustrates an exemplary content editor page according to various embodiments of the present disclosure.

Remote or web-based content editors typically edit web code in a native format. Although this may make rendering of the content easier, the content cannot easily be edited without understanding all aspects of the markup language and accounting for these aspects with each edit of the content. Further, the content cannot easily be ported or converted to other languages or formats without understanding both markup languages or formats and risking formatting issues.

The editing platform described herein can include a suite of tools that can be used to build editing experiences for users. The systems and methods can encapsulate the common and often complex tasks of editing content on the web, while maintaining flexibility in the presentation and ergonomics of the editing experience to the end-user. The system can be built with flexibility of output in mind, maintaining an output agnostic approach in how content is represented as data.

The disclosed systems and methods may utilize the output agnostic format for storing and editing content. The content can be stored as output agnostic root blocks and nested blocks. The root blocks and nested blocks can be rendered to any output format. As an example, the same content can be rendered to HTML for web, HTML for an email, PDF, images, brail, audio file, and other data formats. Further, any vendors or users can create custom renderers to enable content to be output into a vendor or user-defined format (e.g., a PDF that has specific fields or formatting).

When content is edited, rather than modifying the content in the markup format, the system can apply the modifications to the output agnostic root blocks and nested blocks, and regenerate the updates to the content using the updated blocks. Accordingly, in various embodiments, the formatting of the markup language as well as the formatting of other formatting languages is avoided during editing and converting between formatting. The output agnostic content can be output to any format that has a renderer associated with it. The renderers can be built to convert nested data structures into an output-specific format rather than to convert a first output-specific syntax to a second output-specific syntax, which is much more difficult and error-prone.

Further, changes to syntax for a specific output type will only impact a single renderer. With the disclosed system, if a new version of an output format is generated (e.g., a new HTML version), a new renderer can be created. In the following discussion, a general description of the system and its components is provided, followed by a discussion of the operation of the same.

One of the goals of multichannel rendering is to provide the user with the ability to create assets that can be used in a variety of contexts (e.g., emails, web pages, direct mail, ads, etc.). All of these output formats or mediums share different capabilities, constraints, and technical implementations. Building individual content editing systems for each format is time-consuming and leads to inconsistent user experiences, so the content editing systems disclosed herein provide ways to utilize different renderers over time based on needs of the user. To accomplish this, the content editor can be built for a data representation of the content so that any rendering format, either currently available or later created, can support rendering the content.

With reference to FIG. 1, shown is an exemplary content editor page 100 for editing content of a deployment according to various embodiments of the present disclosure. In at least one embodiment, a deployment is referred to as a "campaign" or "targeted campaign." For example, a deployment may refer to a targeted campaign. The deployment can be a targeted marketing deployment, such as an email or mailer deployment, a web page, or some other presentation for an audience, such as customers, prospective customers, users, or other parties. The content editor page 100 can include various content 103 rendered by a web browser. The content 103 can include images 106, text sections 109a-e, and buttons 112, among other elements. The content editor page 100 facilitates editing of the content 103 such that elements can be added, removed, or modified. The content editor page 100 can be rendered or generated for a user as an HTML web page, rendered in a mobile application, or provided in another mechanism.

The content editor page 100 can also include various aspects to facilitate editing of the content 103. As an example, the content editor page 100 may include a set of editor options in a docked window 115, an indication of one or more statuses 118 for the content editor page 100, one or more options to change modes of display 121, undo and redo options 124, save or save and exit options 127, and potentially other aspects as can be appreciated. The docked window 115 can be generated upon election of elements in the content 103. In at least one embodiment, an election is referred to as a "selection." For example, the act of making an election (e.g., electing) can be referred to as making a selection (e.g., electing). The docked window 115 can be customized based on the elements selected. The docked window 115 can be customized automatically for a user depending on the content 103 selected on the content editor page 100. As an example, the docked window 115 can include options for editing elements of text when a text section 109a-e is selected and options for editing buttons when a button 112 is selected.

The content editor page 100 can be generated by an authoring service and/or rendering service. The content 103 can be stored and maintained as a series of blocks, referred to as root blocks and nested blocks herein. The rendering service can generate the content editor page 100 by processing the blocks using a renderer. Each element may correspond to a single nested block or multiple nested blocks. As an example, the button 112 may correspond to a nested block with various elements stored in the nested block, such as a text element with a value of "Button." If a user changes the text of the button 112 to "Click Me," the authoring service can update the value of the element in the nested block to be "Click Me." As such, when the rendering service subsequently generates the content editor page 100, the button 112 will be rendered with the text "Click Me" rather than "Button." In some embodiments, the root blocks and/or nested blocks are updated in response to a save event, which may occur upon election of save option 127. In at least one embodiment, an element (e.g., for example, a text element) is referred to as a "property" (e.g., for example, a text element can be referred to as a text property).

The docked window 115 can include current elements of a current selected option. As an example, the docked window 115 currently shows editing options for a text area, such as text area 109b. The docked window 115 indicates a current font "Georgia" for the text as well as size of "Small" and "Regular" spacing. Upon election of the current font, the docked window 115 can generate a submenu displaying the fonts available for the text. In some embodiments, the docked window 115 may display elements for all text areas in the content 103. Further, the options may correspond to different values for different elements. As one example, the "Small" text size may correspond to 12 pt for heading text area 109a, 8 pt font for text area 109b, 7 pt font for buttons 112, and 8 pt font for alt text of an image 106, while the Medium and Large may have different values for each type. The content editor page 100 can include options to apply any changes (e.g., via the docked window 115) globally to other content elements. The content editor page 100 can also enforce rules or policies (e.g., also referred to as "guidelines"), such as by maintaining specific rations of elements and spacing.

Figure 2:
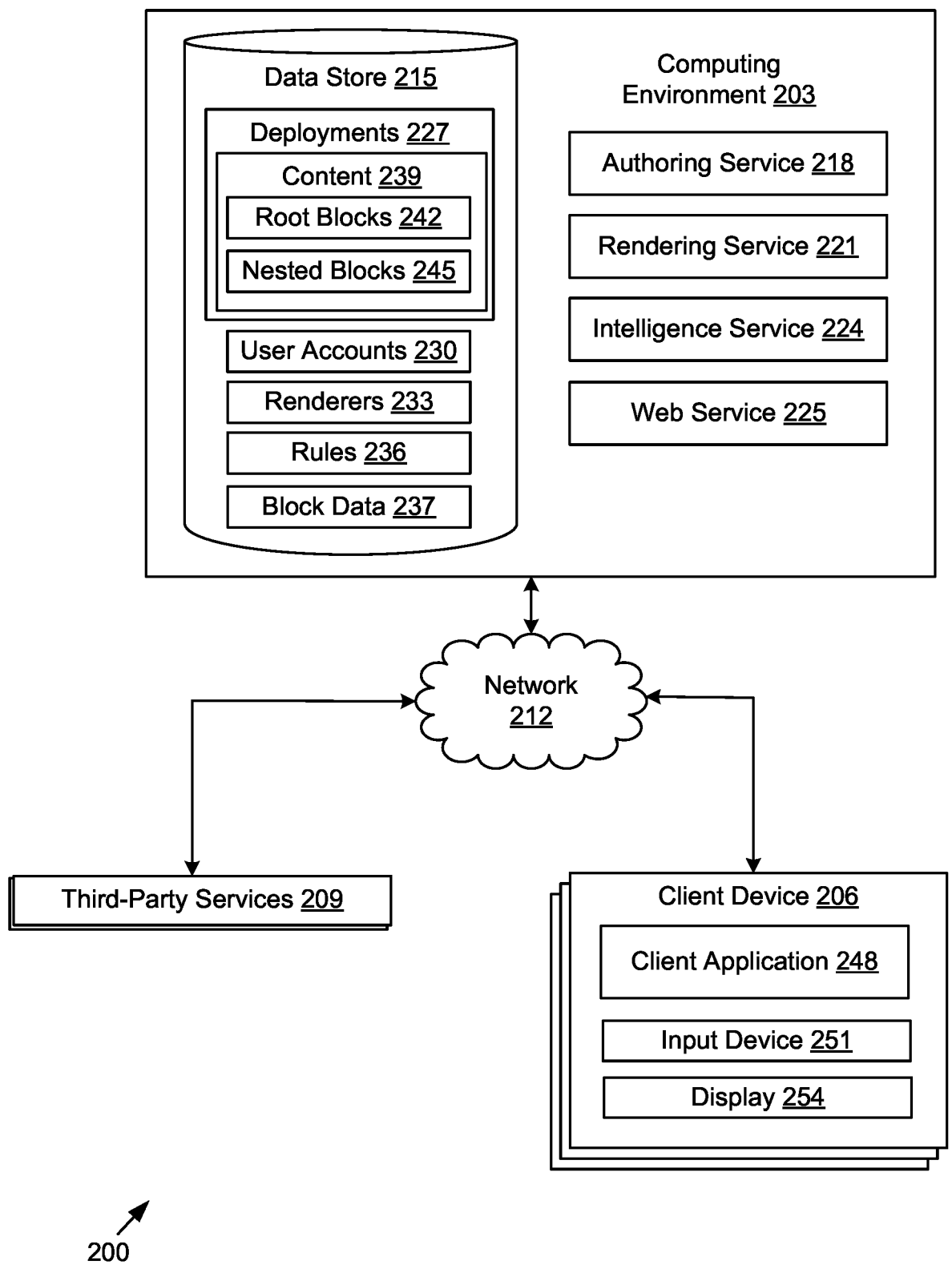
FIG. 2 is a drawing of a networked environment according to various embodiments of the present disclosure.

With reference to FIG. 2, shown is a networked environment 200 according to various embodiments of the present disclosure. The networked environment 200 can include a computing environment 203, one or more client devices 206, and one or more third-party services 209, which are in data communication with each other via a network 212. The network 212 can include, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks.

The computing environment 203 can include, for example, a server computer or any other system providing computing capability. Alternatively, the computing environment 203 can employ one or more computing devices that may be arranged, for example, in one or more server banks or computer banks or other arrangements. Such computing devices may be located in a single installation or may be distributed among many different geographical locations. For example, the one or more computing devices may correspond to one or more hosted computing resources, grid computing resources and/or any other distributed computing arrangements. In some cases, the computing environment 203 may correspond to one or more elastic computing resources where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of more than one data stores 215 as can be appreciated. The data stored in the data store 215 can be associated with the operation of the various applications and/or functional entities described below.

The components executed on the computing environment 203 can include an authoring service 218, a rendering service 221, an intelligence service 224, a web service 225, and other applications, services, processes, systems, engines, or functionality not discussed in detail herein. While the functionality may be discussed with reference to a particular service, it can be appreciated that the functionality of the authoring service 218, the rendering service 221, the intelligence service 224, and web service 225 may be combined or implemented in one or more other applications within the computing environment 203.

The data stored in the data store 215 includes, for example, one or more deployments 227, one or more user accounts 230, one or more renderers 233, one or more rules 236, block data 237, and potentially other data. The deployment 227 can correspond to a channel for distributing content, a targeted marketing deployment, such as email, mailers, online ads, website material, or other content. In some embodiments, the deployment 227 may correspond to deploying of a domain and corresponding website for a user account 230. The deployment 227 can include various content 239 with root blocks 242 and nested blocks 245, among other data. In some embodiments, the content 239 including the root blocks 242 and nested blocks 245 can be stored as data various data structures, instances of classes, or another software-based data format. In some embodiments, the data can be stored as JavaScript Object Notation (JSON), XML, or some other format.

The block data 237 may include primitive blocks and composite blocks. In some embodiments, the primitive blocks do not inherit from any other blocks while composite blocks inherit from at least one primitive block (either directly or indirectly). The composite block may inherit indirectly by inheriting downstream from a primitive block, for example, inheriting from one or more composite blocks that inherit from one or more primitive blocks. A composite block may include all or any of the elements of any blocks that it inherits from. The composite block may add, modify, or remove elements from the blocks that it inherits from. The block data 237 may include types of deployments 227 that nested blocks 245 may be associated with. Some nested blocks 245 may be associated with a specific type of deployment 227, while other nested blocks 245 may be available in multiple types of deployments 227. In some embodiments, the nested blocks 245 can be grouped into sections. The nested blocks 245 can be grouped into sections in a hierarchical structure. Each of the sections can include a respective subset of the nested blocks 245. In some embodiments, the section can correspond to one or more areas of the content 239, such as a header, footer, column, row, or other portion of the content 239. In one embodiment, the section can be a nested block 245. Each section can include metadata or other elements, similar to nested blocks 245. The section can correspond to set area of the content 239, which can be defined by coordinates, spacings, fractions (also referred to as "ratios"), or other spatially defining metadata. In some embodiments, a section can include one or more nested blocks 245 and one or more other sections forming a hierarchical structure.

The composite blocks in block data 237 can also own one or more composite or primitive blocks. The composite blocks can be more complex blocks that describe collections of content. The collections of content in a composite block may break down into primitive blocks at runtime. The composite blocks can adhere to the same data shape as any other block type and may include additional elements or aspects. As an example, a table composite block may own multiple row and column composite blocks. Continuing with this example, each row block may own multiple text primitive blocks, button composite blocks, and other composite blocks, and each primitive and composite block may be associated with a particular block type.

As will be understood from discussions herein, the block types may be unique for each block. The nested blocks 245 may each correspond to a respective one of the particular block types. In one embodiment, the nested blocks 245 can correspond to instantiations of the block types in block data 237. The blocks in block data 237 can have various types. As an example, a content block can render visual content to the screen and a layout block can serve as a container that content blocks, layout blocks, or other types of blocks are contained within. As an example, a row may appear as follows:

{
  "id": 1,
  "type": "ROW",
  "children": [2, 3]
}

Where nested blocks 245 with an ID of 2 and 3 are contained within a row.

In some embodiments, the content and layout blocks may be considered primitive blocks in the system. By using data structures, the system can analyze the data of content 239 as a whole and make optimizations that improve the visual consistency of the final output and reduce the transfer size it requires to transmit the network to the end-user.

The authoring service 218 can be executed to generate a user interface configured to remotely author and edit content. The authoring service 218 can generate a deployment 227 including one or more contents 239. A user can customize the default content 239 by selecting a deployment type from a set of deployment types. Each deployment type may include a different set of default content 239 or one or more templates of content 239. The authoring service 218 can receive changes including additions, removals, and edits to the content 239, and update the content 239 for a deployment 227 according to the changes. As an example, the authoring service 218 can receive a change to add a button to the content 239 and generate a new nested block 245 corresponding to the button while updating other root blocks 242 and/or nested blocks 245 to contain the new button nested block 245. The root blocks 242 and nested blocks 245 may include identifiers, type, elements, children, and other data. As one simple example, content 239 for a page with a row or section and two buttons may be represented as follows:

```
{
   id: 1,
   type: "ROW",
   elements: {
   padding: 10
   },
   children: [
      { id: 2, type: "BUTTON", properties: {text: "Save"} },
      { id: 3, type: "BUTTON", properties: {text: "Cancel"} }
   ]
}
```

In some embodiments, the root blocks 242 and nested blocks 245 can layout content 239 in a specific format. As an example, the blocks 242/245 may layout the content 239 in a grid format with sections, rows, and columns. The sections may contain blocks along horizontal and vertical axes. In some embodiments, a column may be a first child of a section. In at least one embodiment, a section may make up a 12 column grid that can be used to divide up content. The columns may contain child nested blocks 245 along a vertical axis. The rows may be horizontal containers for other nested blocks 245. Child nested blocks 245 may be aligned within the sections, rows, and columns via elements.

The root blocks 242 and nested blocks 245 can include a variety of elements. As an example, a button nested block 245 may include background color, border color, border radius, border style, color, font family, font size, font weight, a link to a page, id, image alterative text, image source, flag for whether the button is full width, padding horizontal, padding vertical, text, and other elements, which may each be implemented differently or the same among various renderers 233. Similarly, a column nested block 245 may include various elements such as background color, grid column start, horizontal alignment, padding, a flag for whether to force a single column, spacing, span, vertical alignment, and other elements. Another type of nested block 245 may be a product block with various elements including image, title, description, price, button, image row, title row, description row, price row, button row, block container, and other elements. In one embodiment, the primitive nested blocks 245 can include buttons, columns, dividers, images, rows, text, and other blocks, while the composite nested blocks 245 can include contained rows, image cards, product blocks, social follow blocks, and other blocks.

The rendering service 221 can be executed to generate a rendering of the content authored using the authoring service 218. In some embodiments, the rendering service 221 can be executed by the authoring service as a functional component, a process, a thread, or as a separate application or service. The rendering service 221 can receive content 239 as an input to generate an output, such as, for example, web pages, emails, instant messages, text messages, images, intermediary files for creation of physical items such as postcards or other marking materials, and other outputs. In some embodiments, the authoring service 218 can receive edits to content 239, process each edit to modify the blocks 242 and 245, and regenerate the user interface via the rendering service 221 in real-time as the edits are being generated.

The rendering service 221 can generate different output using the same content 239. As an example, the rendering service 221 can generate both an image and a web page from the same content 239, where the image may be made up of pixels and the web page is made up of HTML. In some embodiments, the rendering service 221 can utilize one or more renderers 233 to generate or render the content 239. As an example, a button may be stored as a nested block 245 in the content, and the rendering service 221 may utilize an HTML renderer 233 to convert the button nested block 245 into an HTML button such as "<input type=button>Click Me</input>." Further, the rendering service 221 may utilize an email renderer 233 to convert the button nested block 245 into an email button, such as "<a href="http://button.com">Click Me</a>." As such, the rendering service 221 can utilize output agnostic content 239 to generate various types of outputs across various content mediums using various renderers 233. A user can select and generate different deployment types that correspond to different output formats or coding languages from an output agnostic content 239.

The renderer 233 can receive various elements to alter or customize the output for a client device 206. As an example, a client application 248 of a first client device 206 may indicate that a resolution of the display 254 is 1920×1080 pixels (px), and a particular renderer 233 may render the content 239 at 1920×1080 px. Whereas the client application 248 on a second client device 206 may indicate a resolution of the display 254 as 1280×720 px, and the particular renderer 233 may render the content 239 at 1280×720. The renderer 233 can modify or adjust the content based on screen size, screen density, input types available, output types available on the client device 206, and other aspects. As another example, the renderer 233 can generate audio output on hover when a client application 248 indicates that a user is visually impaired. The renderer 233 may generate text from the content 239 in a larger font size or in brail when a user is visually impaired. The renderer 233 may adjust a volume of audio content 239 when a user has difficulty hearing. The content 239 can include multiple sizes of a particular image, and the renderer 233 can select a specific size of the image based on elements of the client device 206 or other elements and context. The rendering service 221 and renderers 233 can analyze the networked environment 200 as a whole or in part to determine final dimension and other elements of the content 239, such as image size, table width, column width, row height, header size, footer size, font size, button elements, etc.

In one embodiment, the rendering service 221 can generate format-specific content 239 for one or more formats, and temporarily store the format-specific content 239. The temporary format-specific content 239 can be used for the deployment 227 to reduce resource load of generating format-specific content 239 from root blocks 242 and nested blocks 245 each time content 239 is requested. The temporary content 239 can be marked stale each time a root block 242 or nested block 245 associated with the content is modified. The temporary content can also be marked as stale if a renderer 233 corresponding to the specific format is modified or updated. The system can process the stale content in a background process by generating a new version of the content 239. In some embodiments, when a request for content 239 is received, the rendering service 221 may determine whether the content 239 is stale, and if so, render a new version of the stale content 239. The rendering service 221 may save the new version of the content 239 once generated for subsequent requests. The rendering service 221 may delete or archive the stale content or mark the stale content for deletion or archiving by a background process.

The intelligence service 224 can be executed to analyze historical data to improve the performance of targeted deployments. The intelligence service 224 can generate one or more policies based on the historical data. The policies can be rules 236 to help to prevent poor performance of targeted deployments. The intelligence service 224 can process historical data (e.g., via machine learning) from the data store 215 that includes performance data, such as click-through rates, as well as content 239 for the deployment to determine correlations between various types of content and strong performance. The intelligence service 224 can determine one or more of: color combinations, spacing of text, line spacings, spacing of columns, font sizes, font types, other front and paragraph elements, number of columns, button style, and other elements that correlate with performance that is below or above a predefined threshold.

As an example, the intelligence service 224 can determine that red, blue, and green together result in performance below a predetermined threshold and generate a rule 236 that prevents or suggests alternatives to these color combinations. Similarly, the intelligence service 224 can determine that three other colors result in a performance above another predetermined threshold and generate a rule 236 to include this color combination as an option. In one embodiment, the rule 236 may only include the set of three colors as an option when one of the three colors is selected for an element in the content 239. For example, a user may select red, and two other colors may be suggested or generated as a set of colors for the page based on a rule 236.

The web service 225 can be executed to provide hosting of web site services. In some embodiments, the web service 225 can include an HTTP server, such as, for example, an Apache HTTP server. The web service 225 can receive a request to register a domain name for a user. In response to the request, the web service 225 can register the domain and initiate generating and editing of content 239 for the website. The web service 225 can deploy and host the generated content 239 for the websites. In some embodiments, if a user is not currently associated with a user account 230, the web service 225 can generate a new user account 230 as part of the domain registration process and website generation process.

The authoring service 218 can determine and enforce, either strictly or loosely, one or more rules 236 during editing of content 239. The authoring service 218 can loosely enforce the one or more rules 236 by generating a warning or popup that allows a user to override the rule 236. In contrast, the authoring service may strictly enforce one or more other rules 236 by not allowing a user to violate or break the rule. In some embodiments, the authoring service 218 can receive an election of an element for a component corresponding to a root block 242 or nested block 245. The component may refer to a user interface element or rendered output created by a renderer 233 when processing one or more blocks 242/245. The authoring service 218 can determine one or more other existing element and adjust the elements according to one or more rules 236. The authoring service 218 can identify the existing element in the same block 242/245 or other blocks 242/245. As an example, the authoring service 218 may receive a change to a text size from 10 pt to 12 pt for a nested block 245 for a button. The authoring service 218 can adjust the text size for all standard text across all blocks 242/245 to 12 pt and increase a font size of a header from 14 pt to 16 pt according to one or more rules 236. Further in this example, one or more rules 236 may specify that the ratio (e.g., or "fraction") of standard font size to header font size should be approximately 5/7, which can be enforced by the authoring service 218. The existing other elements may be edited in a global section of a root block 242, individually in each corresponding nested block 245, or a combination thereof.

In some embodiments, when a value of an element is modified, a direction of the modification is determined. In the previous example, when the text size or font size moves from 10 pt to 12 pt, the authoring service 218 can determine that the value increased. The authoring service 218 can determine other elements related to or similar to the edited element. The similarity may be determined based on one or more rules 236 specifying the similarity, the block structure, a name of an element, or a unit of the element. For example, the authoring service 218 may identify an element based on a pixel, length, color, percentage, fraction (e.g., ratio), or other unit of measurement that is similar. The authoring service 218 can adjust a value of one or more similar element in a same or opposite direction based on the direction of the adjustment of the modified element's value.

The authoring service 218 may iterate through, or traverse in some other way, the plurality of blocks 242/245 to adjust the elements of blocks based on the request. In some embodiments, the data store 215 may include indexed tables to quickly identify and edit various blocks 242/245. For example, the authoring service 218 may identify all button widget nested blocks 245 according to a search by a type of nested block 245, and surface all button widget nested blocks 245 without iterating through the same. In some embodiments, while applying an edit, the authoring service 218 can modify text colors across a set of content 239, apply a button style across the set of content 239, among other iterative edits.

In some embodiments, the authoring service 218 may receive a request to edit an element of a nested block 245 and adjust the element of another nested block 245 instead. In one example, the other nested block 242/245 being edited may correspond to a dependency of the nested block 245 being edited. A nested block 245 for a button widget may be a composite nested block 245 that includes a variety of other nested blocks 245, such as a table nested block 245, a label nested block 245, a button nested block 245, among potentially other nested blocks 245. The authoring service 218 may adjust an element of the label nested block 245 rather than the budget widget nested block 245. The element adjustments may be made according to the one or more rules or policies 236.

The renderers 233 can correspond to software for converting content 239 into one or more formats, such as HTML, an email, XML, an image, audio, brail, or some other format. Each of the renderers 233 can take an input of root blocks 242 and nested blocks 245 and generate an output in a particular format. The renderers 233 can correspond to software or a set of rules or metadata for the rendering service 221 to utilize to generate the output in the particular format. For example, an HTML renderer 233 may include details that a text box corresponds to "<input type="text">." The rendering service 221 and renderer 233 can utilize metadata from the root blocks 242 and nested blocks 245 to modify or adjust the output. In the above example, metadata for a nested block 245 corresponding to the text box can include a label called "First Name." According to the metadata, the HTML renderer 233 may generate "<label for="name">First Name:</label> <input id="name" type="text">." Similarly, other elements like size, color, font, spacing, and other aspects can be configured by the renderer 233 through content-agnostic root blocks 242 and nested blocks 245.

In some embodiments, the renderers 233 can share libraries or components to minimize footprint/computing resources. As an example, an email renderer 233 and an HTML renderer 233 may share many a library for generating some aspects but not for others where the output would differ between the formats. As a further example, while both email renderer 233 and HTML renderer 233 may generate similar cascading style sheets (CSS), the strategy for handling CSS may differ. The email renderer 233 may embed CSS in a header of the email while the HTML renderer may store CSS in a separate file.

The rules 236 can specify one or more rules or policies. Each rule 236 may be hard rules, whereby the computing environment 203 prevents a user from breaking a rule, or each rule 236 may be a soft rule, whereby the user can selectively break one or more rules and is rather advised that a selected configuration may impact performance. In some embodiments, the rules 236 may be generated by intelligence service 224 and enforced by the authoring service 218. The rules 236 may be generated or modified by a user for a particular user account 230 or organization of user accounts 230. As an example, a marketing department from Company A can determine that all users from Company A must follow a particular style policy, which can be stored as rules 236 and enforced for user accounts 230 associated with Company A. The rules 236 for Company A may require a specific font be used and/or that a specified header and footer be used, among other aspects.

The client device 206 can be representative of multiple client devices that may be coupled to the network 212. Each client device 206 can include one or more computing devices, for example, a processor-based system. Such computing devices may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may be configured to execute various applications such as a client application 248 and/or other applications. The client device 206 may include one or more input devices 251, one or more displays 254, and potentially other components. The display 254 can include one or more devices such as liquid crystal display (LCD) displays, gas plasma-based flat panel displays, organic light-emitting diode (OLED) displays, electrophoretic ink (E ink) displays, LCD projectors, or other types of display devices, etc.

The client application 248 may be executed in a client device 206, for example, to remotely edit content. The client application 248 can access network content served up by the computing environment 203 and/or other servers, thereby rendering a user interface on the display 254. To this end, the client application 248 can be, for example, a browser, a dedicated application, etc. The user interface can include a network page, an application screen, etc. The client device 206 may be configured to execute applications beyond the client application 248 such as, for example, email applications, social networking applications, word processors, spreadsheets, and/or other applications. The client application 248 can execute user interface code from the authoring service 218 to provide a content editing experience.

Next, a general description of the operation of the various components of the networked environment 200 is provided. The authoring service 218 can receive a request to generate a targeted deployment. The request can include a template selected from a set of deployment templates. Each deployment template can include default root and nested blocks. Accordingly, in response to the request, the authoring service 218 can generate the targeted deployment with one or more root blocks and one or more nested blocks corresponding to the selected template. The authoring service 218 can generate a user interface configured to receive edits to the content 239 of the deployment 227.

In some embodiments, to reduce network communications, the authoring service 218 can transmit the content 239 to the client application 248 as a data structure including the root blocks 242 and nested blocks 245, and the client application 248 can convert the content 239 into a format, such as HTML, via the user interface code provided by the authoring service 218. Stated differently, the authoring service 218 can generate and provide user interface code that, when executed by the client application 248, can perform the rendering function to convert the blocks 242/245 into a format-specific output. The user interface code executed by the client application 248 can include one or more renderers 233 to process and convert the data structures into an output-specific format.

The user interface can be generated by the rendering service 221 by processing the root blocks and nested blocks. The user interface can correspond to user interface code that can be transmitted to the client application 248. As an example, a web browser client application 248 can request a URL corresponding to editing the deployment 227. The authoring service 218 and rendering service 221 can generate HTML user interface code and transmit the generated code to the web browser client application 248. The user interface code can provide real-time resizing, laying out, and arranging of content 239 within the content 239.

The content 239 can be modified in context rather than in a separate control panel. As an example, text-editing and formatting can be performed inline within close proximity to the selected text rather than in a control panel. Rather than providing cascading style sheet (CSS) forms to a user in a flyout menu, the user interface code can be configured to provide options to refine color and font size in a menu proximate to the content 239 being edited. The user interface code can also provide advanced content editing when a user desires.

The rendering service 221 can parse the root blocks 242 and nested blocks 245 to generate the user interface code. The content 239 can be destination agnostic. The rendering service 221 can utilize one or more renderers 233 to convert the destination agnostic structured data into language-specific code. As an example, an HTML renderer 233 may convert a nested block 245 for a block of text into text surrounded by various HTML tags, such as, "<body>," "<font>," "<b>," and "<p>" among other tags. In contrast, a postcard renderer 233 may convert the nested block 245 for the block of text into a rasterized image for printing. In yet another example, an email renderer 233 may convert the nested block 245 into a formatted text segment in an email. The rendering service 221 and/or renderers 233 can utilize one or more rules 236 while rendering the content 239. The rules 236 may limit or restrict options available in the content 239. As an example, the rules 236 can define a refined typographic scale that can be presented in a user interface. Additional detailed typographical editing options may be available in an advanced mode. Similarly, the palettes shown on the user interface can be curated to apply to all content 239.

The generated user interface can also correspond to a user interface of a client application 248, which may be in HTML, XML, a proprietary protocol, or some code format.

The client application 248 may correspond to an app in a mobile app store. The client application 248 can facilitate remote editing of content 239. The authoring service 218 or rendering service 221 can cause the user interface to be rendered on the client device 206. For example, the authoring service 218 or rendering service 221 can send the user interface code to the client application 248, and the client application 248 can process the user interface code to generate a user interface on the display 254. The client application 248 can receive inputs from a user via input devices 251 and transmit the inputs and requests to the authoring service 218.

The user interface code can be configured to edit content for the targeted deployment. The user interface may look like a rendering of content for the deployment and may include options to edit one or more aspect of the deployment, such as text, images, sizing of elements, colors, text size, text spacing, and other aspects. The authoring service 218 can receive edits via the user interface code. The edits can be processed as each edit is received in real-time (e.g., via AJAX or similar client-server communication), at an interval, or upon an indication of saving by the user. The options to edit content 239 may include an ability to select font pairings to be applied to the content 239, adjust sizing of the content 239 using fraction-based sliders, adjust font sizing using fraction-based sliders, dynamically resize and crop images inline with other content (e.g. see FIG. 5), and insert an image inline, among other options.

The client application 248 and/or authoring service 218 can provide a spell check feature for the content 239. The root block 242 and nested blocks 245 can be parsed and elements associated with text content can be identified and spell checked. Any misspelled words can be indicated (e.g., highlighted, underlined, bolded, font changed) in the content editor page 100. The user interface code may also provide alternative text such that hovering over or selecting a misspelled word will display a list of suggested spellings. In addition to a language spell check, a design check can also be performed by the authoring service 218. As an example, the authoring service 218 can parse the content 239 to identify one or more data structure errors, such as, for example, missing text, tables with no columns or rows, buttons with no text, size fractions that are unappealing. The design check may be performed by applying the one or more rules 236 to the content 239 to identify various tiers of notices (e.g., informational, warning, error, etc.).

The authoring service 218 can review changes made to the system to provide content and layout suggestions based on an intent indicated during the creation of the deployment 227. The intelligence service 224 can process historical performance data to determine the layout suggestions. As an example, the intelligence service 224 can determine that switching from two columns to one column is predicted to increase a click rate by 12%, and the authoring service 218 can recommend reducing from two columns to one column. The authoring service 218 may recommend the addition of contact information, The authoring service 218 can process the edits received from the user and apply the edits to the deployment by modifying one or more root blocks 242 or nested block 245. The modifications can include creating additional nested blocks 245 or root blocks 242, deleting existing nested blocks 245 or root blocks 242, or altering/modifying existing nested blocks 245 or root blocks 242. As one example, a user may change the color of all buttons from red to blue. The authoring service 218 can modify a color element for all nested blocks 245 that represent buttons. The authoring service 218 may iterate through all nested blocks 245 or perform a search to identify all nested blocks 245 of a particular type that corresponds to buttons. In some embodiments, the authoring service 218 can modify a button color element of the root block 242 to modify the color for all button nested blocks 245. Upon rendering, the rendering service 221 can start by editing the nested blocks 245 to overwrite various settings based on global settings from the root blocks 242.

In some embodiments, the user interface can include options for a user to indicate that a setting change should be applied globally. The authoring service 218 can generate a user interface for editing of content. When a user interface widget is selected, such as a button or a text string, a window can be presented with options for editing the widget. The authoring service 218 can restrict the options based on rules 236. When the user selects one of the options for a particular type of widget from the window, the window may also include an option to make the change globally. For example, the authoring service 218 can make a user-selected edit to an element of a button be applied to all buttons when the global option is also selected. The edit may be applied by iterating through all buttons to adjust the element or by changing the element in a root block 242. In one embodiment, the authoring service 218 can update a root block 242 to specify the updated element for the particular nested block type. In another embodiment, the authoring service 218 can update the element for each of the nested blocks 245 that corresponds to the particular nested block 245 type.

Once the content 239 is updated, the rendering service 221 and/or client application 248 can update the user interface by reparsing the updated root blocks 242 and nested blocks 245. The client application 248 can render the updated user interface on the display 254 based on the updated code.

Once a deployment 227 is ready to be deployed, the authoring service 218 may receive an indication of such from a user of the client device 206. The client application 248 may transmit an election of a particular deployment type from one or more available deployment types. The authoring service 218 or rendering service 221 can identify a renderer 233 for the selected deployment type. The rendering service 221 can process the content 239 to generate deployment output data using the renderer 233. The deployment output data may be in the form of a video, an image, an audio segment, a printable file for a brail printer, language-specific code, a three-dimensional print file, or some other format. The rendering service 221 can render the same content 239, which is stored as root blocks 242 and nested blocks 245, into more than one different code language or format using various renderers 233.

During editing, the authoring service 218 may maintain one or more intermediary blocks 242/245 for the rendered content 239 being edited. The authoring service 218 may store the intermediary blocks 242/245 in memory while editing occurs until a save event. As such, the blocks 242/245 may be edited without saving the content 239. The rendering service 221 can generate an updated user interface for editing via the authoring service 218 based on the intermediary blocks 242/245. The client application 248 can render an updated user interface on the display 254 as generated by the rendering service 221.

The authoring service 218 can generate a dynamic user interface for editing of the content 239. The position of a cursor or change in focus on the screen can cause one or more interfaces to appear. The additional interfaces may be otherwise hidden to prevent overloading a user with options that may not be relevant. For example, it may not be helpful to a user to see formatting options for an image while typing content into a text block. However, text formatting options and positioning options for the text block may be helpful. As such, the user interface code may generate or display options for editing of a particular nested block 245 when that particular nested block 245 is interacted with. The interactions can include being selected, gaining focus, having a mouse hovering over, having text being added, removed, or modified, or having some other interaction. The options may be based on current values of elements in the blocks 242/245. As an example, the options may be limited to a subset of options that are identified to perform with other elements of the content 239 according to the rules 236.

In some embodiments, the authoring service 218 may provide an application programming interface or utilize components that can be implemented by other programmers. The programmers can utilize a set of predefined components or nested blocks 245, or may create custom editing tools or windows inside of the existing networked environment 200. Some predefined components may be disabled by default, whereas a user may customize the content editing page 100 by enabling one or more predefined components. In one embodiment, a programmer may selectively include controls depending on a use case, such as, for example, a panel to edit global options, a button editor, an image editing tool, etc.

The editing options may be based on the type of interaction and elements associated with the interaction. As an example, the user interface can include a resize option for an image when the mouse hovers over an edge of the image. Similarly, the resize option can be generated whenever a mouse hovers over an edge of another type of nested block 245, such as, for example, a text area, a button, a column, a row, a table, link, or some other nested block 245. The user interface, via the client application 248, can update to facilitate editing of the nested block 245. Responsive to an election of an editing option, the client application 248 and the authoring service 218 can update the user interface component in real-time to adjust the nested block 245 (or component/widget associated therewith) according to one or more additional inputs via the input device 251.

The authoring service 218 can update the blocks 242/245 according to election and additional input. As an example, the authoring service 218 can adjust a size element in a nested block 245 according to the size being altered in the user interface on the client device 206. The authoring service 218, rendering service 221, and/or client application 248 can generate an updated user interface that includes a user interface component sized according to the received input by using the updated nested block 245. To generate the user interface, the rendering service 221 can parse the root blocks 242 and nested blocks 245.

Because editing the content 239 involves a user modifying (via the interface and authoring service 218) the root blocks 242 and nested blocks 245 whereas deploying the deployment 227 typically does not, the rendering service 221 may utilize a special renderer 233 or directly render the editing user interface. As an example, when an output for a deployment is generated and distributed to end-users, the end-users do not typically have an option to edit blocks 242/245. Rather, the end-users typically interact with the content, such as visiting a website, signing up for a subscription, or some other interaction. When an end-user hovers over an edge of an image, the content generally won't allow the end-user to adjust a size and as such the expected features of an editor for the content 239 differs from the expected features of content 239 that is deployed to end-users.

Figure 3:
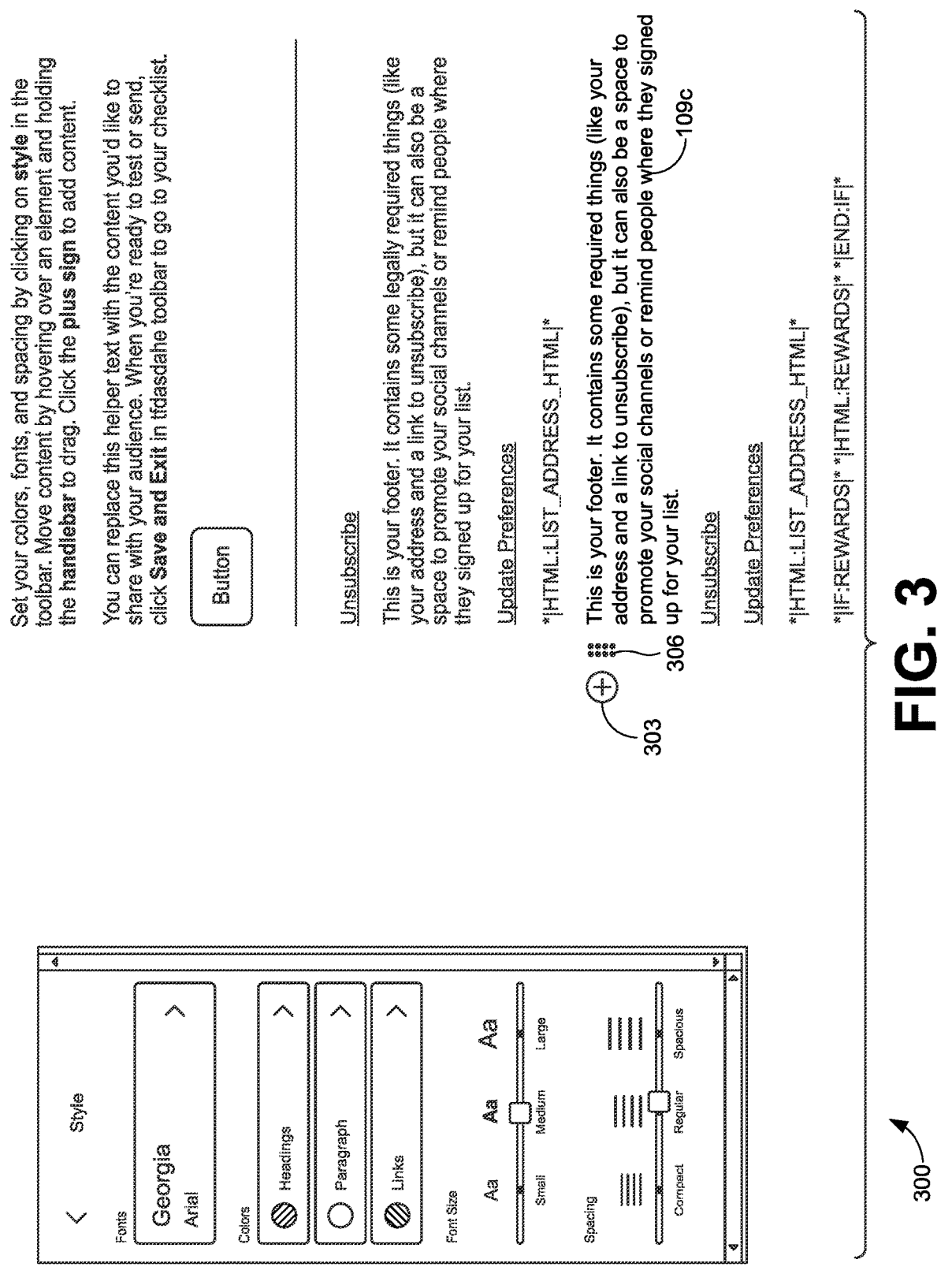

Referring next to FIG. 3, shown is subsection 300 of a content editor page 100 according to various embodiments of the present disclosure. The content editor page 100 can be generated by the authoring service 218 and/or rendering service 221 and shown on a display 254 by client application 248 on a client device 206. The subsection 300 can correspond to when an input device 251 indicates, such as by selecting or hovering over, the text section 109c. For example, a mouse may click the text section 109c or may hover over the text section 109c. The client application 248, according to the user interface code, can generate selectable options, such as option 303 and option 306.

When option 303 is selected, the client application 248 may generate a submenu with options to add additional elements or delete the currently selected element (e.g., text section 109c). Upon election to add an element, the authoring service may generate one or more new nested blocks 245 corresponding to the new element based on a type of element created. Some elements for the nested block 245 may be set to default elements while other elements may be set based on the context of the add operation. As an example, elements corresponding to a position of newly added nested block 245 may be set based on a position of the text section 109c when the block was added. Other elements, such as text size, font, color, among others, may be set according to a current template, other elements of nearby nested blocks 245 or according to one or more elements of a root block 242.

Upon election of a delete element, the client application 248 may send a request, via user interface code, to the authoring service 218 to delete the element, e.g. text segment 109c. The authoring service 218 may identify one or more nested blocks 245 that correspond to the element to delete. In some embodiments, identifiers for the one or more nested blocks 245 can be embedded in the editing user interface code such that the request to delete the element can include the identifier. The authoring service 218 may delete one or more nested blocks 245 that corresponds to the text section 109c (or any currently indicated element). The deletion may include updating references from one or more other nested blocks 245 or root blocks 242. For example, a table nested block 245 may include a reference to the deleted nested block 245 if the deleted nested block 245 was positioned within the table, and the authoring service 218 may update the table nested block 245 as part of the delete operation. Similarly, the authoring service 218 may alter other elements, such as position data, for one or more other nested blocks during deletion of a nested block 245.

The option 306 may facilitate movement of the text section 109c within the content editor page 100. A user may select the option 306 and drag the text section 109c into a different position on the content editor page 100. The authoring service 218 may update positioning information for one or more nested blocks 245 corresponding to the moved element. The authoring service 218 may also update one or more additional nested blocks 245 that have elements that may be affected by moving the selected element.

In some embodiments, the deletion, movements, additions, and/or updates to the nested blocks may be made to temporary data, which is not stored into the data store 215 until a save event occurs. The user interface code may communicate with the authoring service 218 via one or more client-server protocol/languages (e.g., AJAX) without refreshing the content editor page 100.

Figure 4:
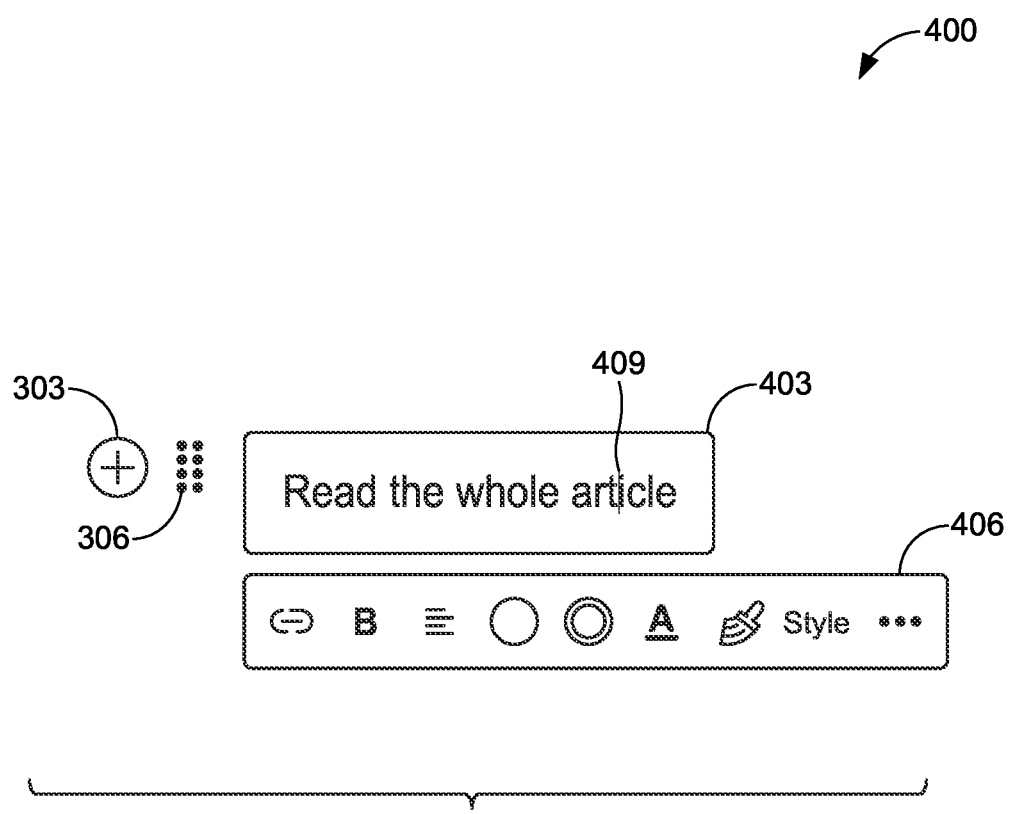
FIG. 4 illustrates an exemplary portion of a content editor page rendered in the networked environment of FIG. 2 according to various embodiments of the present disclosure.

Turning now to FIG. 4, shown is subsection 400 of a content editor page 100 according to various embodiments of the present disclosure. The content editor page 100 can be generated by the authoring service 218 and/or rendering service 221 and shown on a display 254 by client application 248 on a client device 206. The subsection 400 can correspond to when a new text segment is generated or when an existing text segment is being edited. A subsection can include options 303 and 306, a text segment 403, text editing options 406, and a cursor 409.

A user may directly type and edit content in the content editor page 100 without refreshing the page or moving to a separate text editing location. In existing web-based content editors, when text is to be edited, a text window is often created separate from the rendered text of the content editor page 100. However, the present technology enables a user to directly edit aspects of the web page where the elements appear. By storing the content as nested blocks and root blocks, the authoring service 218 can apply the edits to the blocks and the page can be updated via renderers 233 without language-specific issues. The result is a more native feeling content editor when compared to existing editors. As an example, a user may type "a" and the text segment 403 would read "Read the whole article" because the typed text was inserted at the cursor 409. The user can click on another character in the text segment to move the cursor 409 and change where subsequent text is entered.

The options on the content editor page 100 can be limited to those that relate to the current focus of a user. As such, the user interface code can limit when subsection 400 is shown. As an example, subsection 400 may only be shown when text is being edited and only for the text that is currently being edited or added. Selecting a style option, such as bold, may only update the currently selected text segment 403. In some embodiments, the text editing options 406 may include an option to propagate changes to a larger subset of content or to all content (e.g., apply globally option). For example, if the apply globally option is selected, a change of the font of the text segment 403 may be applied to all text on the content 239 or all text in the deployment 227.

When style options (e.g., formatting options, font options, etc.) are selected from the text editing options 406, the authoring service 218 can adjust one or more elements of the nested block 245 corresponding to the text segment 403. If a global option is selected, the authoring service 218 can update one or more additional nested blocks 245 and/or the root block 242 according to the change. The rendering service 221 can update the user interface according to the change by processing the updated root block 242 and nested blocks 245. By editing the blocks 242/245 and regenerating the content 239, issues related to applying the modification to the native languages used with the web browser can be avoided.

Figure 5:
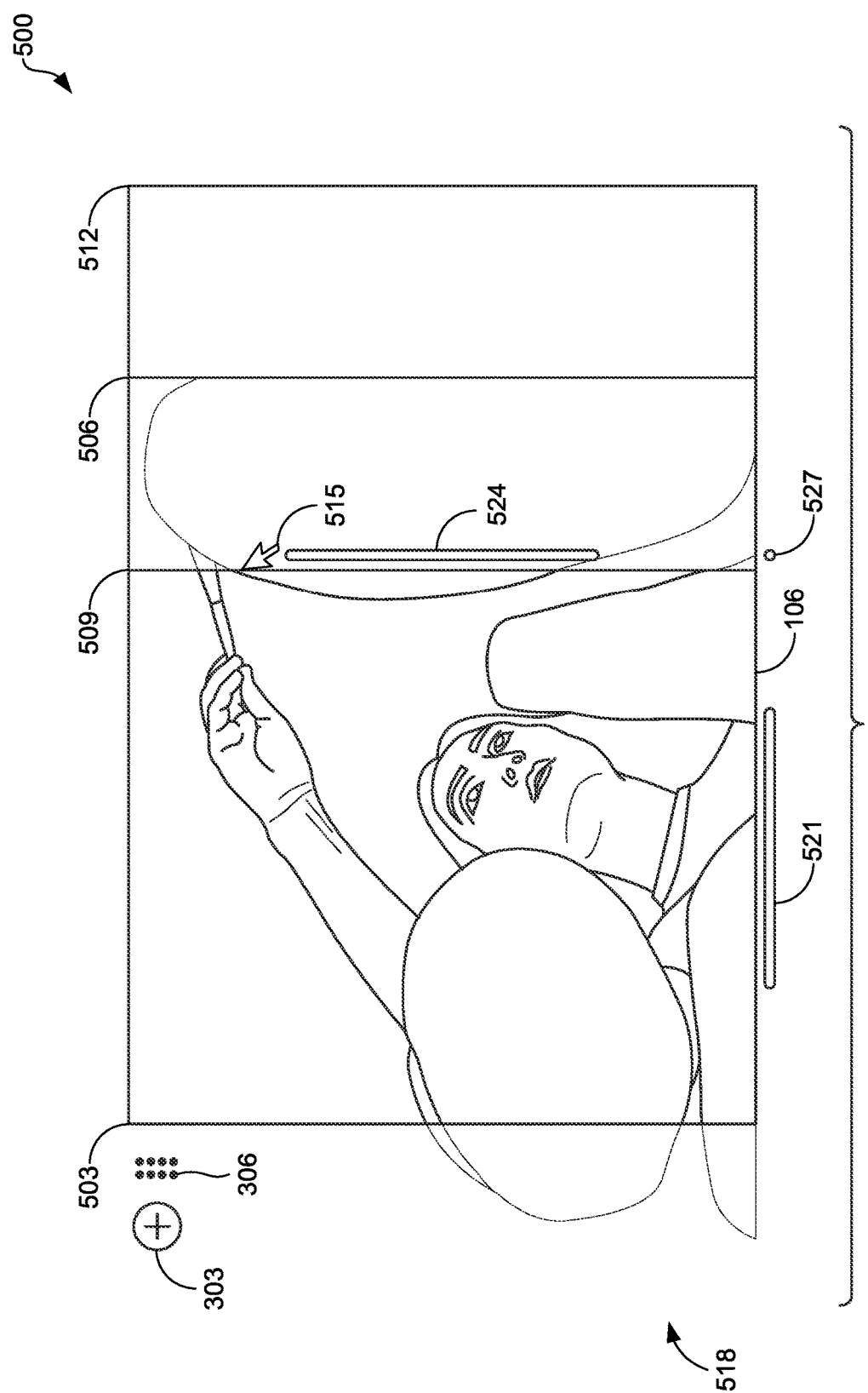
FIG. 5 illustrates an exemplary portion of a content editor page rendered in the networked environment of FIG. 2 according to various embodiments of the present disclosure.

Moving on to FIG. 5, shown is subsection 500 of a content editor page 100 according to various embodiments of the present disclosure. The content editor page 100 can be generated by the authoring service 218 and/or rendering service 221 and shown on a display 254 by client application 248 on a client device 206. The subsection 500 can correspond to when image 106 is being resized by a user of the client device 206.

The subsection 500 includes vertical bars 503, 506, 509, and 512, which were generated by the user interface code in response to reducing a width of the image 106. The user may select an edge of the image 106, and drag the edge of the image 106 to resize. As shown, the image was selected and dragged to cursor 515. The portion of the image between vertical bars 503 and 509 correspond to the portion that will be shown on the content editor page 100 if the cursor 515 releases at that point. The portions between vertical bars 509 and 506 as well as the portions to the left of vertical bar 503 (labeled as area 518) will not be shown. The authoring service 218 may retain the areas of the image 106 that are not shown for future edits. As such, if the user subsequently attempts to resize the image 106 by selecting the edge of the image 106 along vertical line 509, the omitted portions will be selectable. The vertical bar 512 can be shown to illustrate an edge of a current column or area. The edge of the current area can correspond to a maximum size of the image to fit within the content 239.

The subsection 500 can include scroll bars 521 and 524 and a corner indicator 527. In some embodiments, the scroll bars 521 and 524 are selectable to alter a portion of the image that fits within a shown space of the image. In other embodiments, the scroll bars 521 and 524 may be unselectable and rather provide information to a user as to which section of the image 106 is being shown. The indicator 527 can be selected to resize both the horizontal and vertical sizes at the same time.

Figure 6:
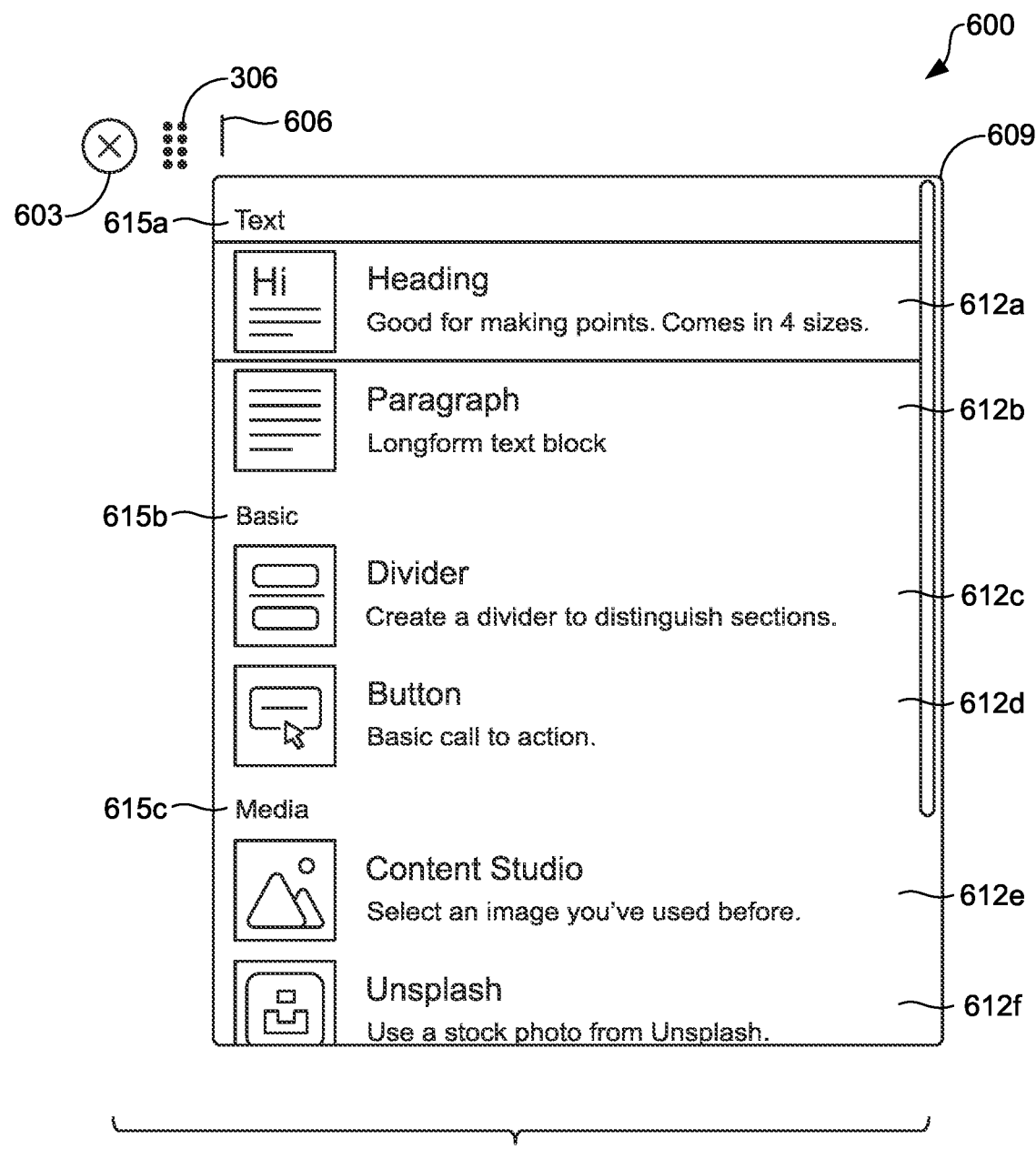
FIG. 6 illustrates an exemplary portion of a content editor page rendered in the networked environment of FIG. 2 according to various embodiments of the present disclosure.

With reference to FIG. 6, shown is subsection 600 of a content editor page 100 according to various embodiments of the present disclosure. The content editor page 100 can be generated by the authoring service 218 and/or rendering service 221 and shown on a display 254 by client application 248 on a client device 206. The subsection 600 can correspond to when option 303 (FIG. 3) is selected to add a new element. The subsection 600 can include options 603 and 306 as well as a cursor 606. The option 603 can be selected to cancel the addition of a new element and option 306 can be selected to move the newly added element.

The window 609 can include a list of types of elements that can be added including elements 612a-f. In some embodiments, the elements 612a-f individually correspond to a respective nested block 245. The authoring service 218 can restrict the list of available elements 612a-f (or of available nested block 245) according to contextual information related to the added element. As an example, the authoring service 218 may exclude an option for a divider when an element is added to a middle of a row of a table, which may or may not make sense. The elements 612a-f can be grouped based on type. As an example, the elements 612a and 612b may be grouped in a text group 615a while elements 612c and 612d are grouped in a basic group and elements 612e and 612f are grouped in a media group 615c.

When text is entered at the cursor 606, the authoring service 218 can filter the list of available options based on the entered text. As an example, the list can be filtered to include only elements 612e and 612f if "media" was entered at cursor 606. The filtering can be performed based on various elements of each nested block including name, metadata, labels for available elements, etc. The list of elements may also be sorted based on a most likely addition. The authoring service 218 can analyze existing elements on the page to forecast a most likely element to be added. The authoring service can score and rank each of the elements 612a-f according to the analysis and can list the elements 612a-f in the window 609 according to the ranking.

When one of the elements 612a-f is selected, the authoring service 218 can generate one or more new nested blocks 245. The generated nested block 245 may have a type corresponding to which of the elements 612a-f is selected. The elements for the generated nested block 245 may be based on other elements in the content 239 or may correspond to default elements for the type of nested block 245 added. Once added, the rendering service 221 may generate an updated user interface that includes the newly generated nested block 245 and the window 609 may be removed or hidden from the subsection 600.

Turning to FIGS. 7A-7F, shown are exemplary root blocks 703 and 712 as well as nested blocks 706, 709, 715, and 718 according to various embodiments of the present disclosure. The root block 703 can correspond to a root block 242. The root block 703 can specify a global element that all buttons include a background color of blue. The root blocks 242 can contain a set of global elements that can be used to set default elements on nested blocks throughout the content 239 before it is rendered into a final format.

In some embodiments, the root block 703 can overwrite any button-specific color elements to force all buttons to have the color blue. In other embodiments, the color blue can be set for the background color for all button nested blocks 245 that do not specify a background, for example, a default color. During initialization of a rendering of content 239, the rendering service 221 can identify that the root block 703 includes a global button background color of blue, and update all nested blocks 245 of a button type to include a buttonBackgroundColor of blue. The rendering service 221 may or may not skip any nested blocks 245 that already include a backgroundColor value.

The nested blocks 706 and 709 are both examples of nested blocks 245 of a button type. The nested block 709 can correspond to the nested block 706 subsequent to the global element of the root block 703 is applied to the nested block 706. In nested block 709, the backgroundColor element is added to the nested block 706 with a value of blue as specified in the root block 703. To update blocks, the following function can be used:

fn(block,newElements)=>updatedBlock

Where block is the nested block 245 (e.g., nested block 706), and newElements is the new element to change (e.g., backgroundColor=blue), and updatedBlock is the resulting modified nested block 245 (e.g., nested block 709).

The root block 712 can correspond to a root block 242. The root block 712 can specify a global element that all buttons include a background color of blue and a button border radius of 4. Similar to root block 703, in some embodiments the root block 712 can overwrite any button-specific color elements and border radius elements to force all buttons to have the color blue and border radius of 4. In other embodiments, the color blue and border radius of 4 can respectively be set for the background color and border radius for all button nested blocks 245 that do not specify a background/border radius. During initialization of a rendering of content 239, the rendering service 221 can identify that the root block 703 includes a global button background color of blue and border radius of 4, and update all nested blocks 245 of a button type to include a backgroundColor of blue and borderRadius of 4.

The nested blocks 715 and 718 are both examples of nested blocks 245 of a button type. The nested block 718 can correspond to the nested block 715 subsequent to the global elements of the root block 712 are applied to the nested block 715. In nested block 718, the backgroundColor element is added to the nested block 715 with a value of blue as specified in the root block 712. However, the borderRadius element of 4 is not modified from the value of 2 in the nested block 715 because the element is already set for the button. In some embodiments, the borderRadius may be overwritten to 4. It should be noted that the element examples provided in FIGS. 7A-F herein are not limited to the button block type.

Referring next to FIGS. 8-12, shown are flowcharts that provide examples of the operation of a portion of the authoring service 218, rendering service 221, intelligence service 224, web service 225, and/or client application 248 according to various embodiments. It is understood that the flowcharts of FIGS. 8-12 provide merely an example of the many different types of functional arrangements that may be employed to implement the operation of the portion of the authoring service 218, rendering service 221, intelligence service 224, web service 225, and/or client application 248 as described herein. As an alternative, the flowcharts of FIGS. 8-12 may be viewed as depicting an example of elements of a method implemented in the computing environments 203, client devices 206, and/or third-party services 209 according to one or more embodiments. While reference may be made to a particular software component, it can be appreciated that the functionality may be performed by anywhere in the computing environment 203, client device 206, and/or third-party service 209.

Figure 8:
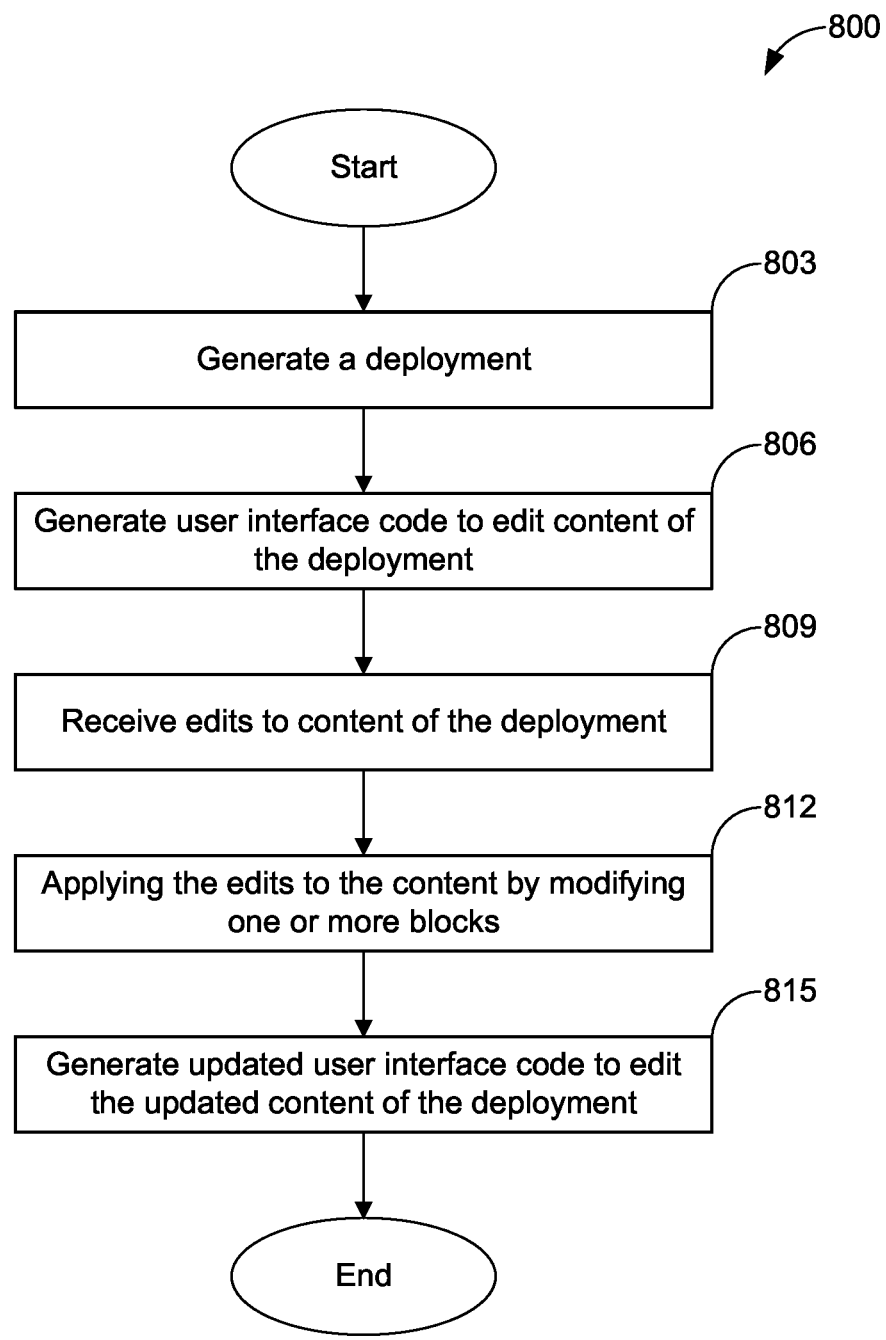
FIG. 8 is a flowchart illustrating one example of functionality implemented as portions of the authoring service executed in a computing environment in the networked environment of FIG. 2 according to various embodiments of the present disclosure.

Beginning with FIG. 8, shown is a flowchart of a process 800 according to various embodiments of the present disclosure. The process 800 can correspond to functionality of the authoring service 218, rendering service 221, intelligence service 224, and/or web service 225, among other programs. The process 800 can be performed when a user edits content 239 for a deployment 227 via a computing environment 203.

At box 803, the process 800 includes generating a deployment. As an example, the authoring service 218 can generate a deployment 227 including content 239 with root blocks 242 and nested blocks 245. The authoring service 218 can receive a request to generate a new deployment from a user of client device 206. In some embodiments, the user may already have a user account 230 and be authenticated. In other embodiments, the user may generate a new user account 230 prior to generating the deployment 227 or may generate a deployment 227 as a temporary unregistered user and register for an account to save the deployment 227 once generated to a user account 230. The temporary unregistered user may be based on cookie data, session data, or other elements/details of the client device 206 or user.

The authoring service 218 may generate a user interface for the client application 248 to provide an election of a type of deployment 227 to generate. For example, the user interface may include a list of types of deployments 227, such as, for example, email, ads, website, landing page, survey, social post, signup form, or postcard, among other types. Each deployment type may be associated with one or more templates, where each template includes default or initial content 239 for use when creating a deployment. The templates can include sets of root blocks 242 and nested blocks 245 to start with when making user-created content 239. A request to generate the deployment can include a type of deployment and a specific template for the deployment to start with.

At box 806, the process 800 includes generating user interface code to edit content of the deployment. The authoring service 218 and/or rendering service 221 can convert the root blocks 242 and nested blocks 245 into user interface code that can be rendered by the client application 248. As an example, the root blocks 242 and nested blocks 245 can be converted via a renderer 233 into HTML, CSS, and JavaScript, among other protocols. The user interface code can be different from a typical rendering of the content 239 in that it can be specifically generated to edit the content 239. As such, the user interface code can include editing options as described herein, which may involve communication with the authoring service 218 or other software running on one or more computing environments 203 or third-party services 209. The client application 248, via the user interface code, can communicate with the authoring service 218 to alter the content based on input from the input device 251.

At box 809, the process 800 includes receiving edits to content of the deployment. For example, the authoring service 218 can receive edits to content 239 of a deployment 227. The authoring service 218 can receive an indication of a save event via the client application 248 and user interface code. As another example, the authoring service 218 can receive user-selected edits in real-time via a client-server protocol, such as AJAX or another protocol. The authoring service 218 may receive each edit over time as the edits occur or may receive the edits as a set or group of edits. The set or group of edits may be received on a fixed time interval (e.g., every 10 seconds, every minute, every 5 minutes, etc.), after a certain count of edits (e.g., after 5 edits, after 10 edits, etc.), after a save event, or based upon some other criteria.

At box 812, the process 800 includes applying the edits to the content by modifying one or more blocks. For example, the authoring service 218 can apply the edits to the content 239 by modifying one or more one or more root blocks 242 and/or nested blocks 245. The authoring service 218 can identify one or more root blocks 242 and/or nested blocks 245, and modify the identified blocks 242/245 to apply the edit. If a background color for a button nested block 245 is altered from Red to Blue, the authoring service 218 can retrieve the button nested block 245 from the data store 215, alter the background color to be blue, and resave the button nested block 245 back to the data store 215. In some embodiment, the data store 215 may accept a programmatic method to alter the content of blocks 242/245, such as a structured query language. As an example, the authoring service 218 may query the data store 215 with an identifier of the button nested block 245 and the element and value to set, and the data store 215 may process the query to edit the button nested block 245.

At box 815, the process 800 includes generating updated user interface code to edit the updated content. As an example, the authoring service 218 and/or rendering service 221 can generate updated user interface code that includes any changes to the root blocks 242 and/or nested blocks 245. In some embodiments, the updated user interface code can be transmitted to the client application 248 for rendering. The client application 248 may or may not refresh the page to render the content 239. In some embodiments, the authoring service 218 may transmit a delta of changes to the user interface code. After the user interface code is updated, the client application 248 can continue to receive additional edits and return to box 809 to process those edits. When edits are complete, the client application 248 can receive one or more commands. As an example, the client application 248 can receive a save command or exit command, and the authoring service 218 can save the content 239 in the data store 215. In some embodiments, the authoring service 218 can automatically save each edit in the data store 215 as the edits are made.

The client application 248 can receive an election of an option to publish, deploy, or act on the content 239. As an example, the authoring service 218 and/or rendering service 221 can invoke process 1200 or a similar process using the content 239 once edited by the functionality of processes 800, 900, 1000, 1100, or other processes, functionality, or steps described herein.

Figure 9:
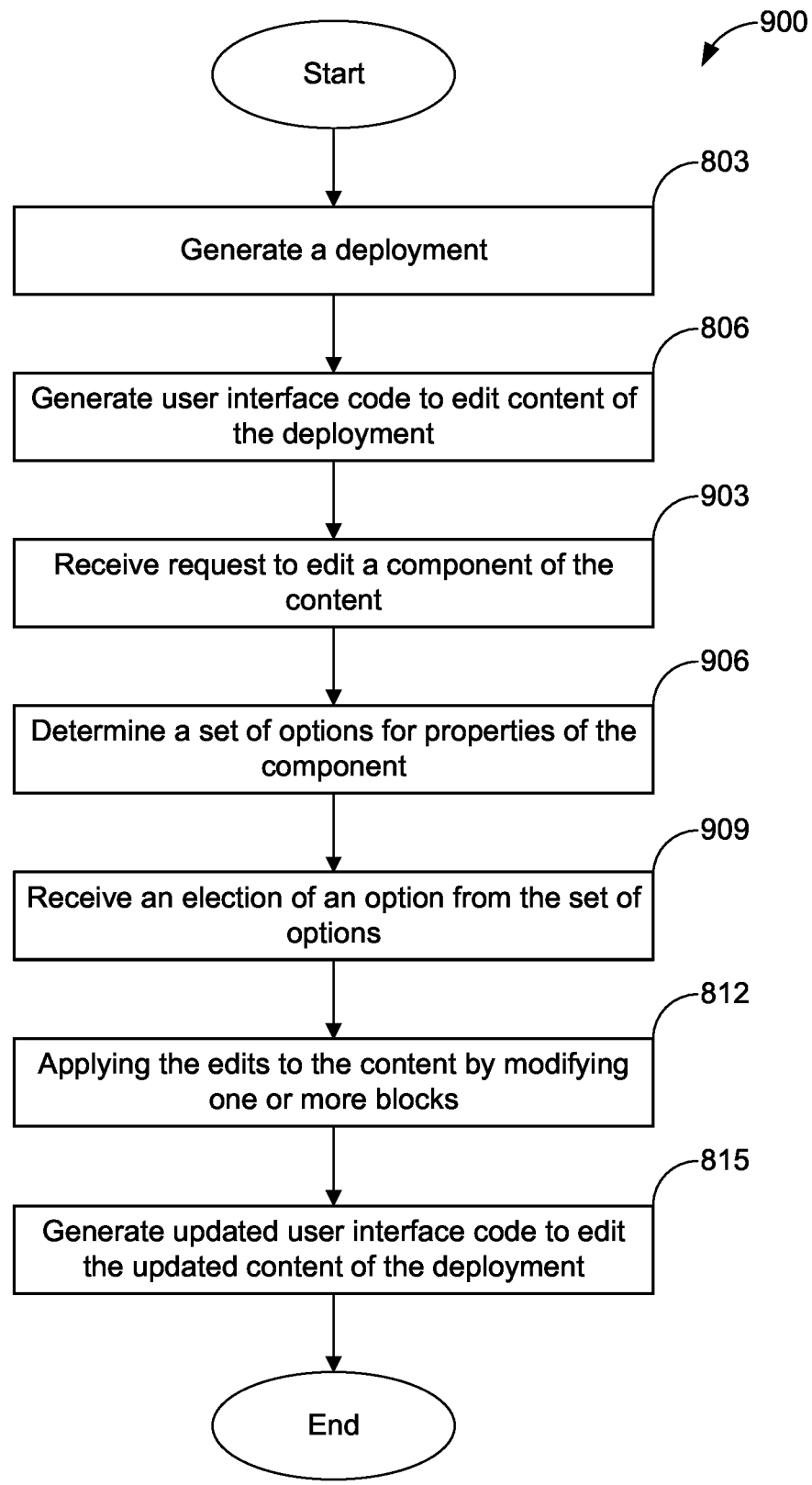
FIG. 9 is a flowchart illustrating one example of functionality implemented as portions of the authoring service executed in a computing environment in the networked environment of FIG. 2 according to various embodiments of the present disclosure.

Referring to FIG. 9, shown is a flowchart of a process 900 according to various embodiments of the present disclosure. The process 900 can correspond to functionality of the authoring service 218, rendering service 221, intelligence service 224, and/or web service 225, among other programs. The process 900 can be performed when a user edits content 239 for a deployment 227 via a computing environment 203. The process 900 can include the steps of 803, 806, 812, and 815 as discussed herein.

At box 903, the process 900 includes receiving a request to edit a component of the content. For example, the authoring service 218 can receive an indication from the client application 248 that a user has indicated a particular element/component of the user interface. The indication may correspond to a mouse hovering over a component or an edge of a component, clicking a component, touching a component, tabbing through components or otherwise using a keyboard to indicate a component, or indicate a component in some other way. Prior to the indication of a particular component, editing options for the particular component may not be shown. In some embodiments, box 809 can include steps of boxes 903, 906, and 909.

At box 906, the process 900 includes determining a set of options for elements of the component. For example, the authoring service 218 can determine options for the particular component indicated in box 903. The options may be based on available or currently configured elements of a type of nested block 245 corresponding to the component. The block data 237 may include user interface data for rendering of editing options for various nested blocks 245 and/or root blocks 242. The authoring service 218 can transmit the identified options and/or user interface code to the client application 248. The client application 248 can generate a menu/window corresponding to the options or a subset of options for the component selected (e.g., docked window 115, option 303, option 306, text editing options 406, vertical and/or equivalent horizontal bars 503, 506, 509, 512, window 609, and other aspects or windows). The generated menu can include tiered content such that a user can select a general type of edit and receive an updated menu with more granular or specific options corresponding to the general type selected.

At box 909, the process 900 includes receiving an election of an option from the set of options. The authoring service 218 can receive an indication of an election of an option from the set of options. The authoring service 218 may cycle between box 906 and 909 to drill down to an element being edited. As an example, a user may 1) select a text area at box 903, 2) receive a set of options including alignment of text, font of text, spacing of texts at box 906, 3) receive an election of font at box 909, 4) generate font options at box 906, and 5) receive an election to change the font color blue at 909. As such, the authoring service 218 can cycle between boxes 906 and 909 until a modification or change is received (including an addition or a removal of a component). When a modification to an element or aspect is received, the authoring service 218 can apply the edit at box 812.

Figure 10:
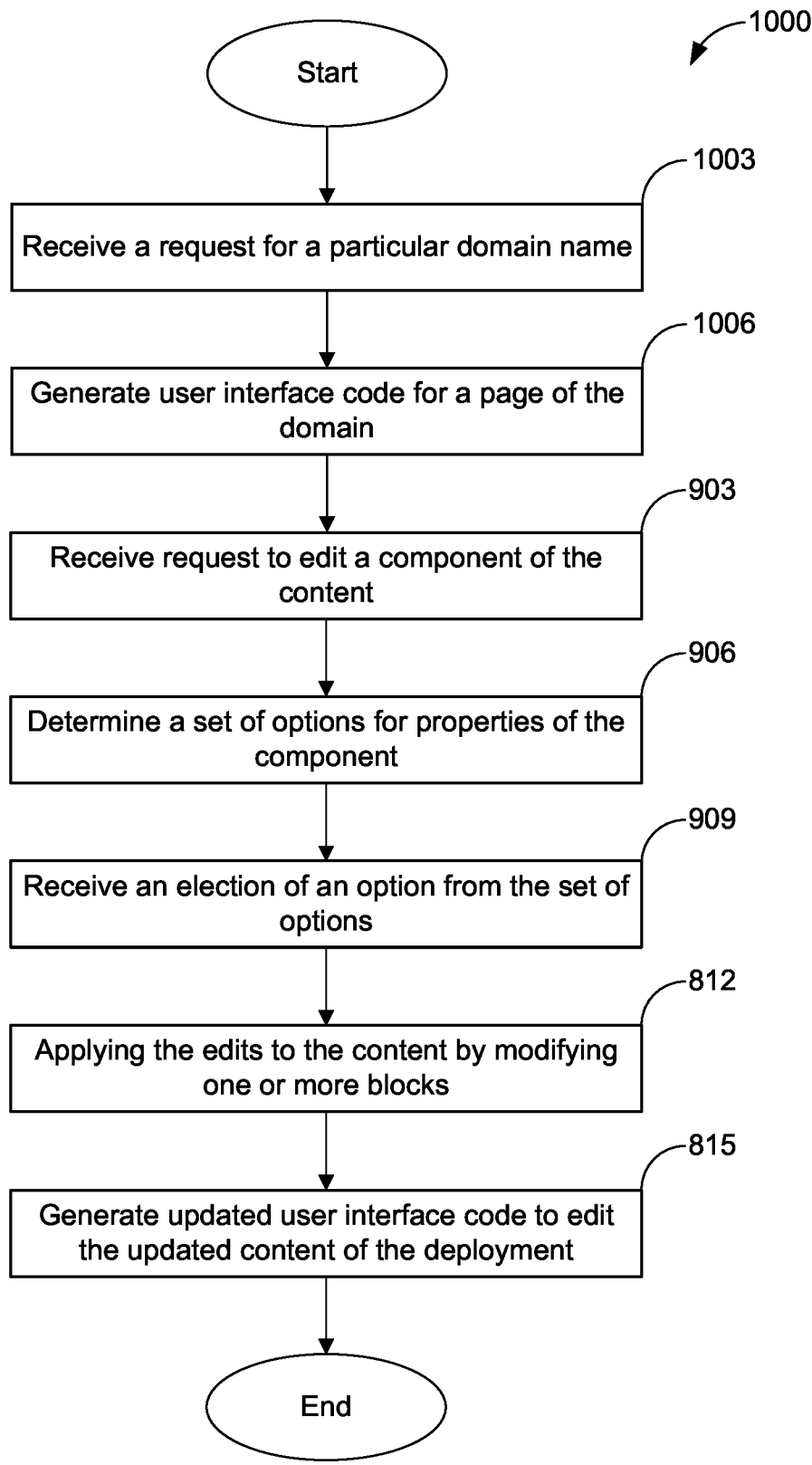
FIG. 10 is a flowchart illustrating one example of functionality implemented as portions of the authoring service and/or web service executed in a computing environment in the networked environment of FIG. 2 according to various embodiments of the present disclosure.

Turning to FIG. 10, shown is a flowchart of a process 1000 according to various embodiments of the present disclosure. The process 1000 can correspond to functionality of the authoring service 218, rendering service 221, intelligence service 224, and/or web service 225, among other programs. The process 1000 can be performed when a user attempts to register and host a new domain name or initiate hosting of an existing domain name within the computing environment 203.

At box 1003, the process 1000 includes receiving a request for a particular domain name. For example, the web service 225 and/or authoring service 218 can receive a request to register a particular domain. The web service 225 can determine an availability of the particular domain name either directly or by querying a third-party service 209. The web service 225 can register the particular domain directly, with the third-party service 209, or through some other domain provider. In some embodiments, the web service 225 may receive a request to host an existing particular domain without registering the domain. The web service 225 can verify ownership of the domain by requiring a file or element of a page hosted at the domain be changed or verified.

In some embodiments, the web service 225 may be configured to host the domain name at a particular storage location. The web service 225 can configure one or more resource records for the particular domain name. As an example, the web service 225 can set a nameserver, mail server, or another resource record associated with the particular domain name. The web service 225 can update the resource record upon registering the domain name, adding the domain name to an account, or upon publishing a landing page for the domain name, among other events. Registration information can be stored in user account 230 for a current user. The registration information can include information about the domain, such as, for example, date registered, price, expiration date, auto-renewal status, and other information.

At box 1006, the process 1000 includes generating user interface code for a page of the domain. The authoring service 218 can receive an election of a template for a landing page for the domain or some other portion of the page. Similar to box 806, the authoring service 218 can generate user interface code to modify/edit the landing page. The authoring service 218 can generate the user interface code based on content 239 including the root blocks 242 and the nested blocks 245. The process 1000 can also include the steps of 903, 906, 909, 812, and 815 as discussed herein to edit the landing page.

The process 1000 can also include publishing the landing page. The landing page can be published after a user has provided edits and indicates that the page is ready for publishing. The web service 225 can generate a web page (e.g., an HTML page) using a renderer 233 to process the content 239 of the landing page. The generated web page can be stored in the storage location corresponding to where the particular domain is hosted. The storage location and domain may be associated with the user account 230. When a web request is received, the web service 225 may look for the requested page for the domain at the storage location. As an example, http://yourdomain.com/index.html may return the landing page stored in the root folder of the storage location and http://yourdomain.com/users/index.html may be stored in the "users" subfolder at the storage location. The registration data stored in user account 230 may be used to load content 239 associated with the user.

Figure 11:
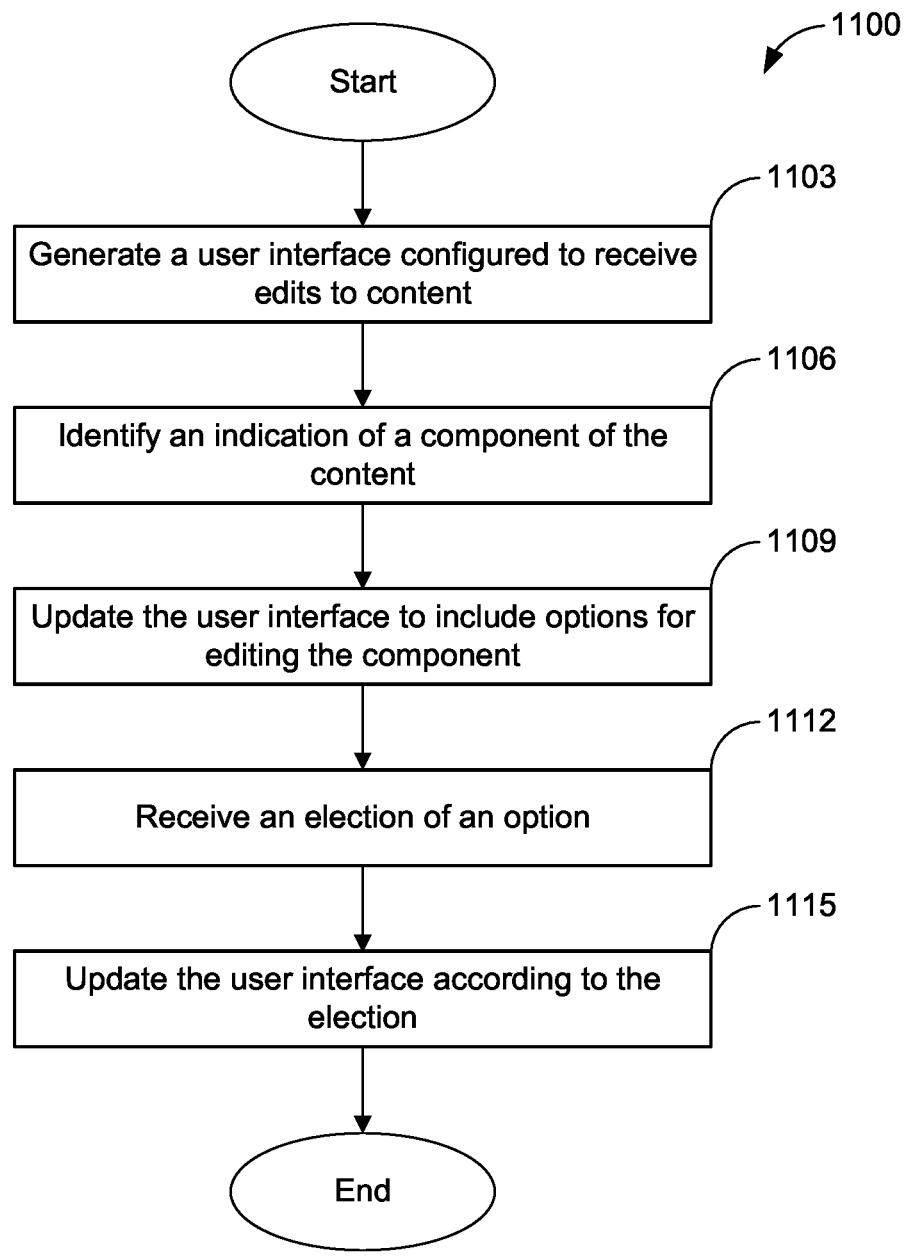
FIG. 11 is a flowchart illustrating one example of functionality implemented as portions of the user interface code executed in the client device in the networked environment of FIG. 2 according to various embodiments of the present disclosure.

With reference to FIG. 11, shown is a flowchart of a process 1100 according to various embodiments of the present disclosure. The process 1100 can correspond to functionality of the user interface code when executed by one or more computing device of the client device 206. At box 1103, the process 1100 includes generating a user interface configured to receive edits to content. The authoring service 218 can output user interface code at box 806 for content 239. The authoring service can transmit the user interface code to the client application 248. The client application 248 can load the user interface code (e.g., as a web page or in an application) to generate a user interface. The generated user interface can be rendered on the display 254 and configured to receive edits to the content 239.

At box 1106, the process 1100 includes identifying an indication of a component of the content. The client application 248 can receive an input from an input device 251. The input can indicate one or more components of the content 239. The client application 248 can identify the one or more components of the content 239 and transmit a message including identifying information for the components to the authoring service 218.

At box 1109, the process 1100 includes updating the user interface to include options for editing the component. For example, the client application 248 can receive the options from the authoring service 218 in response to indicating the component in box 1106. The authoring service 218 can send a list of options or markup code for a window or menu that includes the options that the client application 248 can load and render without refreshing the current page. In some embodiments, the client application 248 will receive new user interface code and generate a new web page that includes the menu.

At box 1112, the process 1100 includes receiving an election of an option. For example, the client application 248 can receive an election by an input device 251 of an option from the menu rendered on the display 254. The client application 248 can send an indication of the option to the authoring service 218. The election can be stored in memory in the client device 206 until a save event occurs, can be sent immediately when the election is received, or on another interval as can be appreciated.

At box 1115, the process 1100 includes updating the user interface according to the election. For example, the client application 248 can receive updated user interface code from the authoring service 218 with the modification being applied. In some embodiments, the client application 248, via the user interface code, can render the change without interaction with the authoring service 218. For example, the user interface code can include logic to facilitate bolding selected text if a bold option is selected from a menu. In this example, the election can be transmitted to the authoring service 218 and the content 239 can be updated, but the content 239 may not need to be updated to display the change. Further in this example, if the user returns at a later time, the newly generated user interface code would include the saved change.

Figure 12:
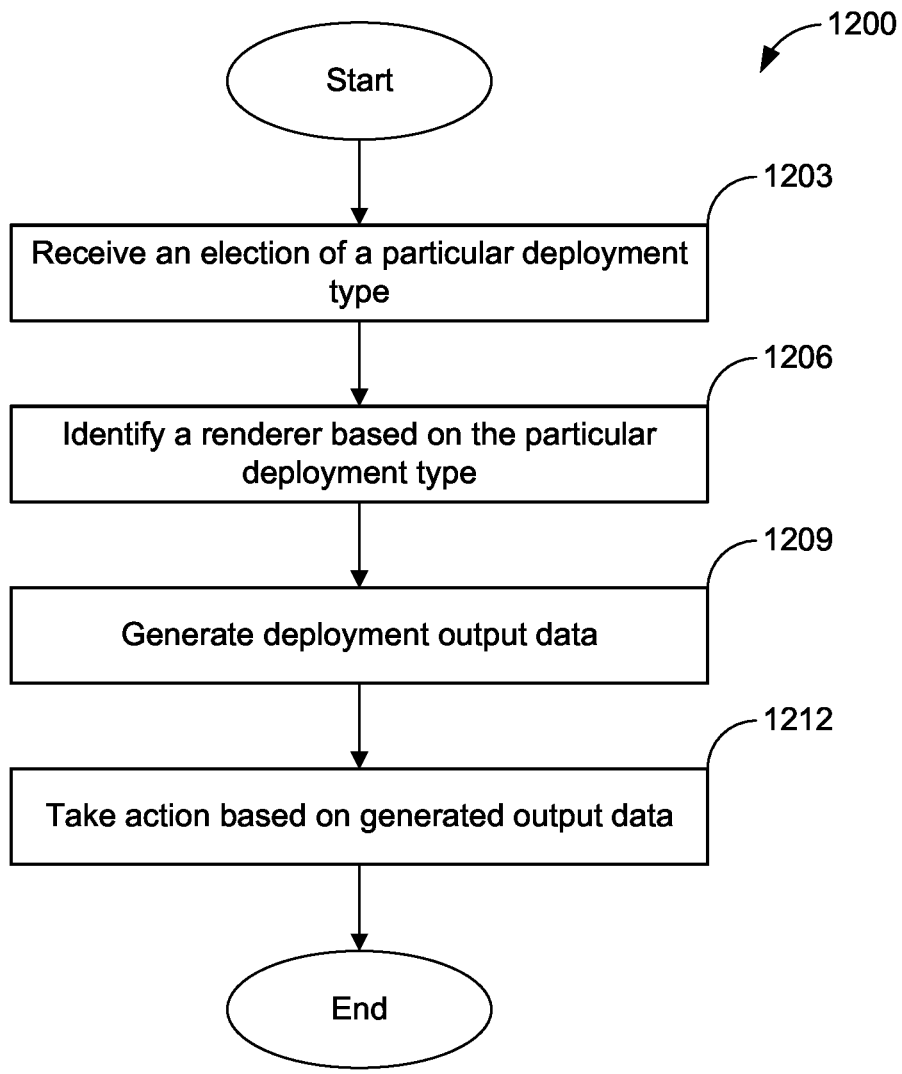
FIG. 12 is a flowchart illustrating one example of functionality implemented as portions of the authoring service, rendering service, and/or web service executed in a computing environment in the networked environment of FIG. 2 according to various embodiments of the present disclosure.

Referring to FIG. 12, shown is a flowchart of a process 1200 according to various embodiments of the present disclosure. The process 1200 can correspond to functionality of the authoring service 218 and/or rendering service 221, among other programs. The process 1200 can be performed when generating deployment output data based on the election of a particular deployment type by one or more computing device of the client device 206.

At box 1203, the process 1200 includes receiving an election of a particular deployment type from one or more available deployment types. For example, the authoring service 218 may receive an election of a type of deployment 227. The authoring service 218 can generate a user interface for the client application 248. The user interface can include a list of deployment types, such as, email, ads, website, landing page, survey, social post, signup form, or postcard, among other types. In some embodiments, the list of deployment types can be limited by a user account 230 corresponding to a user of the client device 206. For example, a user account 230 may have access to a subset of the deployment types. In some embodiments, a user account 230 can unlock access by performing certain steps, such as, for example, deploying a set count of email deployments 227, deploying a deployments 227 of a variety of deployment types, or completing other configurable tasks. In one embodiment, the user may purchase access to deployment types for a user account 230.

The election of a particular deployment type can include an election of a type of deployment 227. The authoring service 218 can request and receive other parameters associated with the deployment 227. The parameters can include a subscriber list to send the deployment 227, a time to send the deployment 227, and other parameters. The time to send the deployment 227 can be selected from a set of available times for some deployment types (e.g., a deployment type with a physical delivery). The system can include a recommendation of a best time to send based on various intelligence data via the intelligence service 224. The best time to send can be based on predictions of user interactions that will occur if sent at different types based on historical data of user interactions. The system can schedule the deployment 227 for sending based on the time selected or determined. The parameters can be specific to the deployment type, such as, for example, election of a type of paper for a paper mailing deployment type, election of a specific computer voice for an audio deployment type, or other deployment specific configurations.

In some embodiments, the deployment type may be automatically selected by the authoring service 218 based on a context of a current situation. For example, after content 239 for a domain landing page is indicated as ready for deployment (e.g., via process 1000), the authoring service 218 can automatically select a particular renderer 233 for generating a landing page. In another embodiment, the user may select the particular deployment type before generating the deployment 227 (e.g., via process 800, 900, 1000, or 1100), and that election may be used at box 1206 when the deployment 227 is indicated as ready for deployment (e.g., when the client application 248 receives a request to deploy the deployment 227 via a user interface, and the client application 248 sends a request to deploy the deployment 227 to the computing environment 203 via network 212).

At box 1206, the process 1200 includes identifying a renderer based on a particular deployment type. For example, the authoring service 218 or rendering service 221 can identify a renderer 233 for a selected or determined deployment type. In some embodiments, a single renderer 233 can correspond to each deployment type. In other embodiments, some deployment types correspond to more than one renderer 233 (e.g. a web renderer 233 and a database renderer 233 as discussed herein). The rendering service 221 can select a renderer 233 by identifying the output format prescribed by the deployment type. In some embodiments, the rendering service 221 can receive an election of user-defined parameters for a particular renderer 233 for outputting deployments 227 in a vendor or user-defined format (e.g., an email that has specific fields or formatting). Once a renderer 233 is selected and content 239 is indicated as ready for deployment, the process 1200 can proceed to box 1209.

At box 1209, the process 1200 includes generating deployment output data. For example, the rendering service 221 can process the content 239 to generate deployment output data using the renderer 233. The deployment output data may be in the format of a video, an image, an audio segment, a printable file for a brail printer, language-specific code, a three-dimensional print file, or some other format.

In some embodiments, the rendering service 221 can generate deployment output data including a web page using a web page renderer 233. As an example, the rendering service 221 can utilize the web page renderer 233 to parse the content 239 including the root blocks 242 and nested blocks 245 to generate one or more web pages. The generated web pages can include markup languages, such as HTML, and programming code, such as PHP, Ruby, JavaScript, or other web-based client-side and server-side code. In some embodiments, the rendering service 221 can generate a database file that can be used to import, generate, or deploy a database for use by the programming code. A subset of the nested blocks 245 can correspond to database tables, rows, columns, and elements. The database nested blocks 245 can be converted by a database renderer 233 to database code (e.g., a structured query language (SQL)). In some embodiments, two or more different renderers 233 can be used for different types of nested blocks 245. As an example, a web renderer 233 can render one or more web files (e.g., PHP, JavaScript, or other content files, etc.), and a SQL renderer 233 can render one or more database files. In some embodiments, different types of renderers 233 can be utilized for different sections in the content 239. The renderers 233/rendering service 221 can parse or iterate through the root block 242 and nested blocks 245 to generate the deployment output data.

At box 1212, the process 1200 includes taking one or more actions based on the generated output data. As an example, the rendering service 221 and/or another service can use the generated deployment output data for any type of action. The rendering service 221 can perform the deployment 227 using the deployment output data. As an example, when the deployment type from box 1203 is email, the system can identify a subscriber list for the deployment 227 and send an email using the deployment output data to an address of each of the subscribers in the subscriber list. In some embodiments, the subscriber list is used to generate the deployment output data. For example, the rendering service 221 can generate deployment output data including a separate communication or output for each subscriber in the subscriber list. Each separate communication may include customized details for the subscriber, such as, name, email address, physical address, preferred name, prefix, communication preferences, preferred color formatting, and other subscriber preferences etc. The system may transmit each of the separate communications to a different respective address corresponding to the respective subscriber.

As one example, a deployment 227 may be generated (e.g., process 800, process 900, or process 1000). A first deployment type of email may be selected at box 1203, and the system can render (with a first renderer 233) and send emails to each subscriber in the subscriber list from the content 239. A second deployment type of mailer may be selected at a different time or concurrently at box 1203, and the system can render (with a second renderer 233) and print a flyer and envelop to mail the flyer to each subscriber in the subscriber list from the same content 239.

In one example, the rendering service 221 receives a request to deploy a web page. The rendering service 221 can identify a web page renderer 233 at box 1206, render the web page to deployment (e.g., web) output data, and take one or more actions using the output data, such as, for example, deploying the web page as a landing page for the domain. For example, the rendering service 221 can store the web page in a storage location corresponding to a domain name. In one embodiment, the web service 225 can be configured to host the domain name. In some embodiments, the rendering service 221 can generate more than one web page and store the web pages in one or more storage locations corresponding to the domain name. The web service 225 can assign a storage location on a storage device to serve the web page from. The output data can be stored in the assigned storage location. In one example, the output data can be stored with a predefined name, such as index.html, index.php, or some other file name. The predefined name can correspond to a file that the web service 225 serves when a user requests the root domain name.

In some embodiments, the rendering service 221 configure the web service 225 to host the domain name. In other embodiments, the web service 225 can configure itself to host the domain by modifying or generating one or more configuration files and create a folder to host the domain. Configuration can include generating one or more resource records for the domain for domain name system (DNS) based on elements of the web service 225. The elements of the web service 225 can include one or more nameservers, one or more folder locations, one or more port numbers, subdomain elements, add-on domain elements, resource records, or other elements. As an example, the web service 225 can correspond to one or more nameservers and the domain can be configured to point to the one or more nameservers. When a user entered the domain name in a browser, the resource records can be used to connect the browser to the web service 225. The configuration can include generating mail exchange resource records, address resource records, canonical name resource records, or other types of resource records.

In some embodiments, the rendering service 221 can configure the web service 225 to host a domain name (e.g., a domain named registered for a current user account 230). The domain name can be hosted by the web service 225 with a landing page corresponding to the deployment output data.

Figure 13:
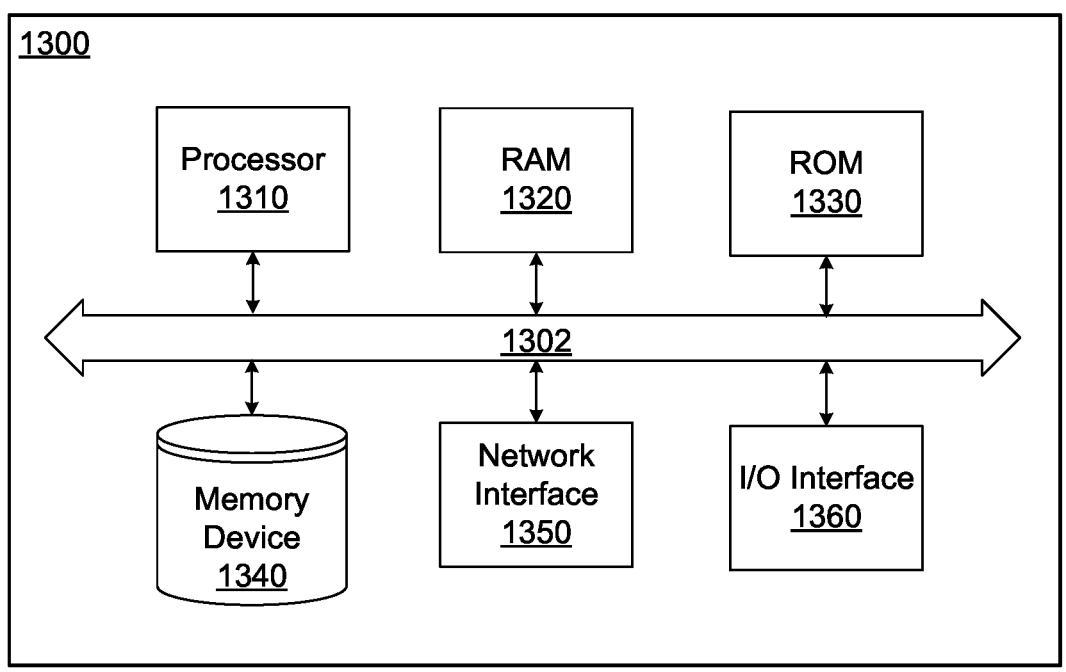
FIG. 13 is a schematic block diagram that provides one example illustration of a computing environment and computing devices employed in the networked environment of FIG. 2 according to various embodiments of the present disclosure.

With reference to FIG. 13, shown is a schematic block diagram of the computing environment 203 according to an embodiment of the present disclosure. The computing environment 203 includes one or more computing devices 1300. Each computing device 1300 includes at least one processor circuit, for example, having a processor 1310 and a memory 1340, both of which are coupled to a local interface 1302. To this end, each computing device 1300 may include, for example, at least one server computer or like device. The local interface 1302 may include, for example, a data bus with an accompanying address/control bus or other bus structure as can be appreciated.

Stored in the memory 1340 are both data and several components that are executable by the processor 1310. In particular, stored in the memory 1340 and executable by the processor 1310 are the authoring service 218, the rendering service 221, the intelligence service 224, the web service 225, the client application 248, and potentially other applications. Also stored in the memory 1340 may be a data store 215 and other data. In addition, an operating system may be stored in the memory 1340 and executable by the processor 1310.

It is understood that there may be other applications that are stored in the memory 1340 and are executable by the processor 1310 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1340 and are executable by the processor 1310. In this respect, the term "executable" means a program file that is in a form that can ultimately be run by the processor 1310. Examples of executable programs may be, for example, a compiled program that can be translated into machine code in a format that can be loaded into a random access portion of the memory 1340 and run by the processor 1310, source code that may be expressed in a proper format such as object code that is capable of being loaded into a random access portion of the memory 1340 and executed by the processor 1310, or source code that may be interpreted by another executable program to generate instructions in a random access portion of the memory 1340 to be executed by the processor 1310, etc. An executable program may be stored in any portion or component of the memory 1340 including, for example, random access memory (RAM) 1320, read-only memory (ROM) 1330, hard drive, solid-state drive, USB flash drive, memory card, optical disc such as compact disc (CD) or digital versatile disc (DVD), floppy disk, magnetic tape, or other memory components.

The memory 1340 is defined herein as including both volatile and nonvolatile memory and data storage components. Volatile components are those that do not retain data values upon loss of power. Nonvolatile components are those that retain data upon a loss of power. Thus, the memory 1340 may include, for example, random access memory (RAM) 1320, read-only memory (ROM) 1330, hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM 1320 may include, for example, static random access memory (SRAM), dynamic random access memory (DRAM), or magnetic random access memory (MRAM) and other such devices. The ROM 1330 may include, for example, a programmable read-only memory (PROM), an erasable programmable read-only memory (EPROM), an electrically erasable programmable read-only memory (EEPROM), or other like memory device.

Also, the processor 1310 may represent multiple processors 1310 and/or multiple processor cores and the memory 1340 may represent multiple memories 1340 that operate in parallel processing circuits, respectively. In such a case, the local interface 1302 network interface 1350, and/or I/O interface 1360 may be an appropriate network that facilitates communication between any two of the multiple processors 1310, between any processor 1310 and any of the memories 1340, or between any two of the memories 1340, etc. The local interface 1302 may include additional systems designed to coordinate this communication, including, for example, performing load balancing. The processor 1310 may be of electrical or of some other available construction.

Although authoring service 218, rendering service 221, intelligence service 224, web service 225, client application 248, and other various systems described herein may be embodied in software or code executed by hardware as discussed above, as an alternative the same may also be embodied in dedicated hardware or a combination of software/hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application-specific integrated circuits (ASICs) having appropriate logic gates, field-programmable gate arrays (FPGAs), or other components, etc.

The flowcharts of FIGS. 8-11 show the functionality and operation of an implementation of portions of the authoring service 218, the rendering service 221, the intelligence service 224, the web service 225, and/or the client application 248. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 1310 in a computer system or other system. The machine code may be converted from the source code, etc. If embodied in hardware, each block may represent a circuit or a number of interconnected circuits to implement the specified logical function(s).

Although the flowcharts of FIGS. 8-11 show a specific order of execution, it is understood that the order of execution may differ from that which is depicted. For example, the order of execution of two or more blocks may be scrambled relative to the order shown. Also, two or more blocks shown in succession in FIGS. 8-11 may be executed concurrently or with partial concurrence. Further, in some embodiments, one or more of the blocks shown in FIGS. 8-11 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authoring service 218, the rendering service 221, the intelligence service 224, the web service 225, and the client application 248, that include software or code can be embodied in any non-transitory computer-readable medium for use by or in connection with an instruction execution system such as, for example, a processor 1310 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the authoring service 218, the rendering service 221, the intelligence service 224, the web service 225, and the client application 248, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1300 or in multiple computing devices in the same computing environment 203 or client device 206. Additionally, it is understood that terms such as "application," "service," "system," "engine," "module," and so on may be interchangeable and are not intended to be limiting. For example, while specific functionality may be described as happening by a specific application (e.g., the authoring service 218, the rendering service 221, the intelligence service 224, the web service 225, and the client application 248), it us understood that the functionality described may be interchangeable and is not intended to be limiting to a specific component.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Language such as "based on" unless specifically stated otherwise, is otherwise understood to included "based at least in part on." For the purposes of this application, the term automatically can refer to functionality being performed by a computing device with substantially no user interaction or no user interaction being required.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for generating a deployment, comprising:
a data store; and
at least one computing device in communication with the data store, the at least one computing device being configured to:
generate the deployment comprising a root block and a plurality of nested blocks;
generate user interface code configured to edit content for the deployment by:
parsing the root block and the plurality of nested blocks;
generating the user interface code based on the root block and the plurality of nested blocks; and
causing a user interface to be rendered on a display according to the user interface code;
receive a plurality of edits to the content for the deployment via the user interface code over a period of time; and
subsequent to each of the plurality of edits:
apply a respective edit to at least one of: the root block and at least one of the plurality of nested blocks;
generate updated user interface code based on the root block and the plurality of nested blocks; and render an updated user interface on the display according to the updated user interface code.

2. The system of claim 1, wherein the at least one computing device is further configured to:
receive an election of a particular deployment type of a plurality of deployment types;
identify a renderer of a plurality of renderers based on the particular deployment type; and
generate deployment output data, via the renderer, corresponding to the particular deployment type from the root block and the plurality of nested blocks.

3. The system of claim 2, wherein the deployment output data comprises second user interface code and a first code language of the user interface code differs from a second code language of the second user interface code.

4. The system of claim 1, wherein the deployment further comprising a plurality of root blocks that includes the root block.

5. The system of claim 1, wherein the at least one computing device is further configured to store the deployment along with the root block and the plurality of nested blocks in the data store.

6. The system of claim 1, wherein a particular one of the plurality of edits corresponds to a global change for a particular type of nested blocks and the at least one computing device is further configured to modify a subset of the plurality of nested blocks according to the global change by iterating through the nested blocks, wherein the subset corresponds to the particular type of nested blocks.

7. The system of claim 1, wherein a particular one of the plurality of edits corresponds to a global change for a particular type of nested blocks and the at least one computing device is further configured to modify an element of the root block according to the global change.

8. The system of claim 7, wherein the at least one computing device is further configured to:
iterate through the plurality of nested blocks; and
generate a plurality of intermediary nested blocks by applying a plurality of global styles from the root block to the plurality of nested blocks, where the updated user interface code is generated based on the plurality of intermediary nested blocks.

9. The system of claim 1, wherein the at least one computing device is further configured to:
perform a spell check on content associated with at least one of: the root block and the plurality of nested blocks;
identify at least one misspelled word in the content; and
generate the user interface code with code to highlight the at least one misspelled word in the content.

10. A method for generating a deployment, comprising:
generating, via the at least one computing device, a user interface code configured to edit content for the deployment comprising a root block and a plurality of nested blocks by;
parsing the root block and the plurality of nested blocks;
generating the user interface code based on the root block and the plurality of nested blocks; and
causing a user interface to be rendered on a display according to the user interface code;
receiving, via the at least one computing device, at least one edit to the content for the deployment via the user interface code over a period of time; and
subsequent to the at least one edit:
applying, via the at least one computing device, the at least one edit to at least one of: the root block and at least one of the plurality of nested blocks;
generating, via the at least one computing device, updated user interface code based on the root block and the plurality of nested blocks; and
rendering, via the at least one computing device, an updated user interface on the display according to the updated user interface code.

11. The method of claim 10, further comprising:
receiving, via the at least one computing device, an election of a particular deployment type of a plurality of deployment types;
identifying, via the at least one computing device, a renderer of a plurality of renderers corresponding to the particular deployment type; and
generating, via the at least one computing device and the renderer, deployment output data corresponding to the particular deployment type from the root block and the plurality of nested blocks.

12. The method of claim 11, further comprising:
receiving, via the at least one computing device, a second election of a second particular deployment type of the plurality of deployment types, the second particular deployment type differing from the particular deployment type;
identifying, via the at least one computing device, a second renderer of a plurality of renderers corresponding to the particular deployment type, the second renderer differing from the renderer; and
generating, via the at least one computing device and the second renderer, second deployment output data corresponding to the second particular deployment type from the root block and the plurality of nested blocks.

13. The method of claim 12, wherein a first coding language corresponding to the deployment output data differs from a second coding language corresponding to the second deployment output data.

14. The method of claim 10, wherein the deployment further comprising a plurality of root blocks that includes the root block.

15. A non-transitory computer-readable medium embodying a program for generating a deployment, wherein the program, when executed by at least one computing device, causes the at least one computing device to:
generate the deployment comprising root block and a plurality of nested blocks;
generate a user interface code configured to edit content for the deployment by:
parsing the root block and the plurality of nested blocks;
generating the user interface code based on the root block and the plurality of nested blocks; and
causing a user interface to be rendered on a display according to the user interface code;
receive a plurality of edits to the content for the deployment via the user interface code over a period of time;
apply the plurality of edits to at least one of: the root block and at least one of the plurality of nested blocks;
generate updated user interface code based on the root block and the plurality of nested blocks; and
render an updated user interface on the display according to the updated user interface code.

16. The non-transitory computer-readable medium of claim 15, wherein the user interface code is represented by a different format than the root block and the plurality of nested blocks.

17. The non-transitory computer-readable medium of claim 15, wherein the root block and the plurality of nested blocks are stored as a data in data structures.

18. The non-transitory computer-readable medium of claim 15, wherein applying the plurality of edits comprises the program causing the at least one computing device to:
  determine that a global update option been selected for any of the plurality of edits; and
  in response to the global update option being selected, update the root block to according to a subset of the plurality of edits.

19. The non-transitory computer-readable medium of claim 15, wherein applying the plurality of edits comprises the program causing the at least one computing device to:
  determine that a global update option been selected;
  in response to the global update option being selected:
    iterate through the plurality of nested blocks; and
    in each iteration for a respective block:
      determine whether any of the plurality of edits correspond to the respective block; and
      in response to a subset of the plurality of edits corresponding to the respective block, apply the subset of the plurality of edits to the respective block.

20. The non-transitory computer-readable medium of claim 15, wherein applying the plurality of edits comprises the program causing the at least one computing device to:
  determine that a global update option is unselected for a particular edit of the plurality of edits corresponding to a particular nested block; and
  in response to the global update option being unselected, apply the particular edit to the particular nested block.

* * * * *